United States Patent
Rapaport et al.

(10) Patent No.: US 10,533,278 B2
(45) Date of Patent: Jan. 14, 2020

(54) BROMINATED EPOXY POLYMERS AS TEXTILE-FINISHING FLAME RETARDANT FORMULATIONS

(71) Applicant: BROMINE COMPOUNDS LTD., Beer Sheva (IL)

(72) Inventors: Ella Rapaport, Lachish Darom (IL); Itzhak Shalev, Beit Gamliel (IL); Ganit Levi-Ruso, Beer Sheva (IL)

(73) Assignee: BROMINE COMPOUNDS LTD., Beer-Sheva (IL)

( * ) Notice: Subject to any disclaimer, the term of this patent is extended or adjusted under 35 U.S.C. 154(b) by 776 days.

(21) Appl. No.: 14/917,694

(22) PCT Filed: Sep. 11, 2014

(86) PCT No.: PCT/IL2014/050807
§ 371 (c)(1),
(2) Date: Mar. 9, 2016

(87) PCT Pub. No.: WO2015/036998
PCT Pub. Date: Mar. 19, 2015

(65) Prior Publication Data
US 2016/0215443 A1 Jul. 28, 2016

Related U.S. Application Data

(60) Provisional application No. 61/876,783, filed on Sep. 12, 2013.

(51) Int. Cl.
*D06M 15/55* (2006.01)
*C08G 59/30* (2006.01)
*C09K 21/14* (2006.01)

(52) U.S. Cl.
CPC ........... *D06M 15/55* (2013.01); *C08G 59/308* (2013.01); *C09K 21/14* (2013.01); *D06M 2200/30* (2013.01)

(58) Field of Classification Search
CPC ...... D06M 15/55; D06M 13/11; D06M 23/08; D06M 2200/30; C08G 59/308; C09K 21/14
See application file for complete search history.

(56) References Cited

U.S. PATENT DOCUMENTS

| 3,955,032 A | 5/1976 | Mischutin |
|---|---|---|
| 4,600,606 A | 7/1986 | Mischutin |

(Continued)

FOREIGN PATENT DOCUMENTS

| EP | 0 728 798 | 8/1996 |
|---|---|---|
| JP | 48-32130 | 4/1973 |

(Continued)

OTHER PUBLICATIONS

International Search Report issued in PCT/IL2014/050807 dated Mar. 2, 2015.

(Continued)

*Primary Examiner* — Cephia D Toomer
(74) *Attorney, Agent, or Firm* — Nixon & Vanderhye P.C.

(57) ABSTRACT

The present invention discloses novel flame retardant aqueous formulations comprising micronized particles of brominated epoxy polymers having a predetermined molecular weight and glass transition temperature, their use as flame retardants for textile applications, their preparation and flame-retarded textile fabrics prepared by using them.

12 Claims, 3 Drawing Sheets

(56) References Cited

U.S. PATENT DOCUMENTS

| | | | | | |
|---|---|---|---|---|---|
| 4,762,751 | A | * | 8/1988 | Girgis | B32B 27/12 |
| | | | | | 428/375 |
| 4,997,702 | A | * | 3/1991 | Gazit | B32B 27/20 |
| | | | | | 442/146 |
| 2004/0121114 | A1 | | 6/2004 | Piana et al. | |
| 2006/0266986 | A1 | | 11/2006 | Day et al. | |

FOREIGN PATENT DOCUMENTS

| | | |
|---|---|---|
| JP | 11-179725 | 7/1999 |
| WO | WO 01/07500 | 2/2001 |
| WO | WO 2004/108826 | 12/2004 |
| WO | WO 2006/035868 | 4/2006 |

OTHER PUBLICATIONS

Written Opinion of the International Searching Authority issued in PCT/IL2014/050807 dated March 2, 2015.
Avento et al., "Antimony and Other Inorganic Compounds," *Kirk-Othmer Encyclopedia of Chemical Technology*, 1980, vol. 10, $3^{rd}$ ed., pp. 355-372, John Wiley & Sons.
Gardner, "Toxicological risks of selected flame-retardant chemicals," 2000, *Environment Studies & Toxicology*, National Research Council, p. 507, <http://www.nap.edu/catalog/9841.html>.
Touval, "Flame Retardants, Antimony and Other Inorganic Agents," *Kirk-Othmer Encyclopedia of Chemical Technology*, pp. 1-19, online edition, John Wiley & Sons.
Office Action issued in JP Appln. No. 2016-542436 dated Sep. 4, 2018 (w/ translation).

\* cited by examiner

BROMINATED EPOXY POLYMERS AS TEXTILE-FINISHING FLAME RETARDANT FORMULATIONS

This application is the U.S. national phase of International Application No. PCT/IL2014/050807 filed Sep. 11, 2014 which designated the U.S. and claims the benefit of U.S. Provisional Application No. 61/876,783 filed Sep. 12, 2013, the entire contents of each of which are hereby incorporated by reference.

Textiles are an essential part of everyday life and are found, for example, in draperies, cloths, furniture and vehicle upholsteries, toys, packaging material and many more applications. Consequently, textile flammability is a serious industrial concern.

Flame retardants used for the protection of textiles must be environmentally and physiologically safe, compatible with the fabric, non-damaging to the aesthetical and textural properties of the fabric (for example, to remain transparent) and must be resistant to extensive washing and cleaning (generally termed as "durable"). Above all, a flame retardant agent suitable for textile treatment should pass the standard flammability tests in the field, preferably even after 5 washing cycles or more.

Flame retardation of textiles using aromatic bromine-containing formulations adhered to the substrates by means of binders, has been long established (for instance, U.S. Pat. Nos. 3,955,032 and 4,600,606).

The main drawbacks of existing formulations include high bromine content demand, high dry add-on demand, streak marks on dark fabrics, excessive dripping during combustion of thermoplastic fibers and dispersion instability. Most of these drawbacks are inherent to the aromatic bromine compounds used. Furthermore, using existing aromatic bromine containing formulations, the percentage of resin component may be as high as 60-70% by weight of the total fabric weight (add-on), in order to obtain satisfactory flame retardation (see Toxicological Risks of Selected Flame-Retardant Chemicals (2000), by Donald E. Gardner (Chair) Subcommittee on Flame-Retardant Chemicals, Committee on Toxicology, Board on Environmental Studies and Toxicology, National Research Council page 507). This high add-on is due in part to the large amount of binder needed to fix the flame retardant (FR) agents to the textile. The binder may be as high as 50% by weight of the total FR formulation (see Toxicological Risks of Selected Flame-Retardant Chemicals (2000) page 507). Due to its substantial presence, the binder contributes to flammability and dripping, which requires more bromine content, thus creating an inefficient cycle. Yet further, often, the high add-on adversely affects otherwise desirable aesthetical and textural properties of the fabric. For example, upon application of a FR with a large amount of binder, fabrics may become stiff and harsh and may have duller shades, and poor tear strength and abrasion properties.

Over the years, several antimony-based compounds have been used as flame-retardant synergists, including $Sb_2O_3$, $Sb_2O_5$ and $Na_3SbO_4$ (Touval, I., (1993) "Antimony and other inorganic Flame Retardants" in Kirk Othmer's Encyclopedia of Chemical Technology, Vol. 10, p. 936-954, 4th Edition, John Wiley and Sons, N.Y.). Antimony based compounds are very expensive and are therefore not used on their own, but are used as synergists with other flame retardants. The addition of antimony oxide (ATO) to halogenated flame retardants increases their efficiency and reduces the amount of additives and/or FR agent to be used. However, the addition of such synergist is costly and further contributes to the high add-on of the formulation.

Thickening agents are also often added to flame retardant formulations in order to increase their viscosity and facilitate the application of the FR formulations on the textiles. However, as in the case of binders, the thickening agents are often flammable compounds themselves, and therefore an additional amount of FR agent and/or synergist in necessary to overcome this adverse effect.

In order to obtain better flame retarded textiles, an efficient flame retardant is required that can be useful in low binder/thickener content and that would have good dispersion properties, on top of the other qualities discussed above.

Polymers are generally preferred as FR agents, over small molecules, due to their low biological penetration into cells, and thus are considered of lower toxicological impact. One class of toxicologically suitable polymers are epoxy polymers.

Epoxy polymers or epoxy resins, also known as polyepoxides are a class of reactive prepolymers and polymers which contain epoxide groups. Epoxy resins may be reacted (cross-linked) either with themselves through catalytic homopolymerisation, or with a wide range of co-reactants including polyfunctional amines, acids (and acid anhydrides), phenols, alcohols, and thiols. These co-reactants are often referred to as hardeners or curatives, and the cross-linking reaction is commonly referred to as curing. Reaction of polyepoxides with themselves or with polyfunctional hardeners forms a thermosetting polymer, often with strong mechanical properties as well as high temperature and chemical resistance. Epoxy polymers have a wide range of applications, including metal coatings, use in electronics/electrical components, high tension electrical insulators, fiber-reinforced plastic materials, and structural adhesives.

Brominated epoxy polymers are known as flame retardants in the plastic industry and are prepared by melting during the preparation of the thermoplastic material fiber. Some examples are listed below:

US20060266986 (to Rhodia) discloses flame retardant yarns and textiles and the process of obtaining them from a thermoplastic matrix, whereby at least one flame-retardant agent is deposited in the threads, fibers and/or filaments during the extrusion production. Among the thermoplastic matrixes disclosed therein are, inter alia, brominated epoxy oligomers.

In another example, EP728798 (to Sumitomo Chemical Company) discloses the preparation of flame retardant thermoplastic polyester resin composition. In particular, it discloses the melting together (melt-kneading) of an impact-resistance improver (A) and of a flame-retardant (B), whereas component B may be, among other options, bromine-containing flame retarders such as brominated epoxy oligomer.

In yet another example, WO2001007500 (by the present applicant) discloses a flame retardant compound for use with thermoplastic resins, which is a halogenated epoxy resin, having its epoxy groups blocked at least partially by halogenated bisphenol monoalkyl ether (HBPMAE).

In a further example, WO2004108826 (to DOW) discloses a curable flame retardant epoxy resin composition including (a) at least one flame retardant epoxy resin; (b) at least one amphiphilic block copolymer; and (c) a curing agent wherein the flame retardant epoxy resin can be a brominated epoxy resin.

However, as noted in all of the examples above, brominated epoxy polymers have never been proposed for textile finishing applications, which have completely different requirements as compared to extrusion and plastic applications. Among other requirements, in textile coating applications the flame retardant must be dispersible in aqueous media, must provide dispersions that are stable for 6 months or more, must be compatible with waterborne adhesive emulsions such as latex or polyacrylates, must provide flame retardancy at dry add-ons of less than 50% of the substrate self weight, must yield a flexible, tranluscent, continuous and non flaking coating, must provide a coating that is durable to laundry and must be non-leaching from the coating film.

In order to obtain better flame retarded textiles, an efficient flame retardant is required that can be useful in low binder/FR synergist content and that would have good dispersion properties, on top of the other qualities discussed above.

Thus, there remains a need to find novel aqueous dispersions suitable as flame retardants in the textile industry, and forming flame retardant textiles that will possess the special requirements noted herein.

The present invention surprisingly discloses the successful preparation of stable and efficient brominated epoxy polymers aqueous dispersions, and their use as finishing formulations in textile applications.

It has now been found that brominated epoxy polymers can be processed to obtain novel brominated flame retardant formulations, in the form of aqueous dispersions, which can then be applied on a variety of fabrics without damaging the aesthetical or textural properties of the fabric, maintaining these properties even after many washing cycles.

Different brominated epoxy polymers have been prepared and found to effectively flame retard textiles, as described below.

As can be seen from Examples 1-12 hereinbelow, aqueous dispersions comprising micronized particles of at least one brominated epoxy polymer effectively flame retarded a variety of fabrics, while exhibiting unexpected homogeneity and transparency, at a relatively low binder content.

Therefore, according to one aspect of the invention, there is now provided a flame retardant formulation, in the form of an aqueous dispersion, comprising micronized particles of at least one brominated epoxy polymer and an aqueous carrier.

As can be seen in Table 1 below, several brominated epoxy polymers (termed the F-series or "FR" throughout the specification) have been prepared:

TABLE 1

| FR | CAS No | MW gr/mol | Bromine content | Softening range/Tg |
|---|---|---|---|---|
| F-2100 # | 68928-70-1 | 20,000 | 52% | 180-205° C. |
| F-2100L* | 68928-70-1 | 10,000 | 52% | 170-190° C. |
| F-2016 # | 68928-70-1 | 1,600 | 50% | 105-121° C. |
| F-2400* | 68928-70-1 | 50,000 | 53% | 145-155° C. |
| F-3020# | 135229-48-0 | 2,000 | 56% | 105-120° C. |
| F-3516# | 158725-44-1 | 1,600 | 54% | 107-117° C. |
| F-3100* | 135229-48-0 | 15,000 | 53% | 180-220° C. | micronized to have: $d_{99} < 25$ microns, $d_{90} < 15$ microns and $d_{50} < 5$ microns
*milling was impossible due to hardness of material F-2100, F-2100L, F-2016 and F-2400 are all defined as Tetrabromobisphenol A-tetrabromobisphenol A diglycidyl ether copolymer and have the same CAS Number (68928-70-1), sharing the same repeating unit, with a different n in the formula below:

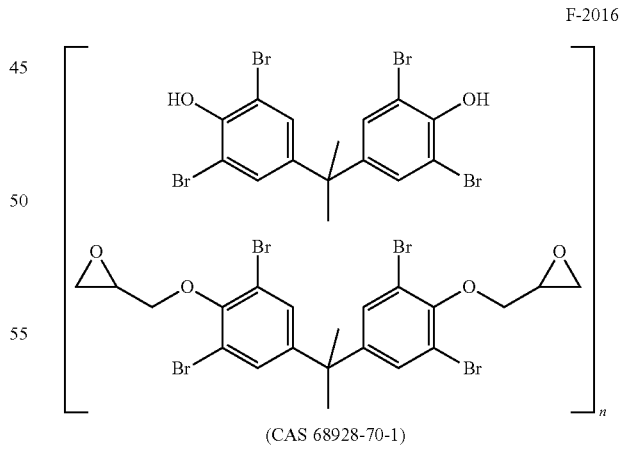

(CAS 68928-70-1)

F-3020 is an end capped brominated epoxy polymer (CAS No 135229-48-0), whose chemical name is 2,2'-[(1-Methylethylidene)bis[(2,6-dibromo-4,1-phenylene)oxymethylene]]bisoxirane polymer with 2,2',6,6'-tetrabromo-4,4'-isopropylidenediphenol and 2,4,6-tribromophenol. Its structure appears in the formula below:

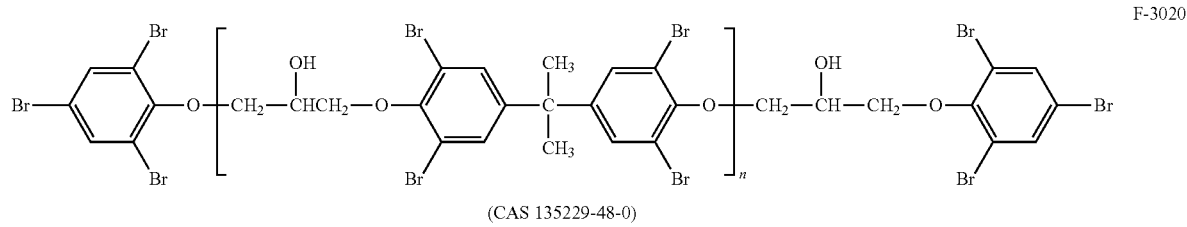

(CAS 135229-48-0)

F-3516 is another end capped brominated epoxy polymer (CAS No 158725-44-1), whose chemical name is (Phenol, 4,4'-(1-methylethylidene)bis[2,6-dibromo-, polymer with 2-(chloromethyl)oxirane, reaction products with 2,4,6-tribromophenol. Its structure appears in the formula below:

While all of the brominated epoxy polymers of Table 1 are within this range, it has been further found that another important requirement is that the brominated epoxy polymers would have a molecular weight (Mw) that will not exceed 20,000 grams/mol.

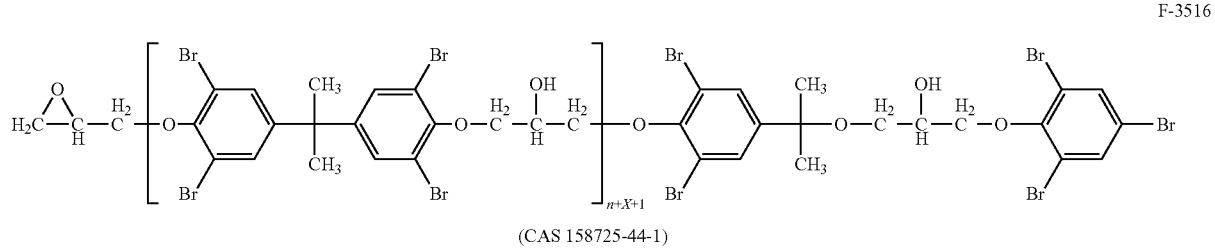

(CAS 158725-44-1)

F-3100 is also an end-capped brominated epoxy polymers. They were not further tested since milling was impossible due to the hardness of the material.

It has been found that preferably, the brominated epoxy polymer should have a glass transition temperature (Tg) that is lower than the fabric processing temperature (typically between 70° C. and 180° C.), so that the FR particles will penetrate and evenly distribute within the fabric during processing of the fabric.

As used herein, the term "softening temperature" is used interchangeably with the terms "glass transition temperature" (for glassy polymers) or "melting temperature" (for crystalline polymers).

Therefore, one important requirement for the brominated epoxy polymer FR is that it will have a glass transition temperature (Tg) that is lower than about 200° C.

As can be seen from Table 1, the F-series flame retardants all pass the Tg and Mw requirements provided above, except F-2400 which has a molecular weight higher than 20,000 grams/mol (50,000 grams/mol), and indeed has been found unsuitable for textile finishing applications (see Example 1).

Table I summarizes the stability, size distribution, flammability and durability experiments done on the F-series brominated epoxy polymers.

As can be deducted from Table I, the inventors have further found that the flame retardant particles need to be micronized in order to be suitable for application on the textile fabric, and hence F 2400 and F 3100, which could not be milled, are not considered suitable brominated epoxy polymers for use in the present invention.

TABLE I

| FR | Particle Size reduction | Stability and feel | Flammability Before Laundry | Laundry Durability to (Flammability after laundry) | | |
|---|---|---|---|---|---|---|
| | | | | 50% 50% cotton/ polyester | 100% polyester | 100% cotton |
| F-2016 | Milling was easy | good | Passed All performed well for flammability | Passed above 7% Br | Passed above 6.7% Br | Passed above 7% Br |
| F-3020 | Milling was easy | good | Passed All performed well for flammability | Passed above 7% Br | Passed above 5.8% Br | Passed above 7% Br |

TABLE I-continued

| FR | Particle Size reduction | Stability and feel | Flammability Before Laundry | Laundry Durability to (Flammability after laundry) | | |
|---|---|---|---|---|---|---|
| | | | | 50% 50% cotton/ polyester | 100% polyester | 100% cotton |
| F-3516 | Milling was easy | good | Passed All performed well for flammability | Passed above 8% Br | Passed above 7% Br | Passed above 8.5% Br |
| F-2100 | Milling was difficult, required 3 passes | Good but rough texture and sandy feel | Passed. Performed well for all fabrics. | Passed above 8% Br | Passed above 8.5% Br | failed |
| F-2100L | Milling was difficult, required 2 passes | Good but rough texture and sandy feel | Pass All performed well for flammability | Passed above 8% Br | Passed above 8.5% Br | failed |
| F-2400 | Milling was Impossible due to hardness of material. Therefore not suitable to textile application | | | | | |
| F-3100 | Milling was Impossible due to hardness of material. Therefore not suitable to textile application | | | | | |

As can also be seen from Table I, F-2100 and F-2100L are possible flame retardants and passed most flammability tests, except on cotton, but their milling was more difficult than that of F-2016, F-3020 and F-3516. Furthermore, their application on fabric resulted in undesirable rough texture and sandy feel.

Thus, according to one aspect of the present invention, there is now provided a textile flame retardant formulation, in the form of an aqueous dispersion, comprising micronized particles of at least one brominated epoxy polymers having:
 a) a molecular weight ranging from 1,000 to 20,000 grams/mol; and
 b) a glass transition initiation temperature (Tg) that is lower than about 200° C.;
and an aqueous carrier.

The term "micronized particles" refers to particles having an average particle size of about 10 microns or less in size. A range from about 1 to 10 microns is contemplated with a range of about 1 to 5 microns preferred with a range of about 1 to 3 microns especially preferred. The micronized particles may be prepared from particles greater than 10 microns in size by using milling techniques known in the art such as wet milling or dry milling. Thus, as used herein, the term "micronized particles" may be interchangeably used with the term "milled particles" or "milled brominated epoxy polymers".

The term "epoxy polymers" may be interchangeably used with the term "epoxy resins" or "polyepoxides" or epoxy prepolymers" or the like, as is known to a person skilled in the art, and generally refer to reactive prepolymers and polymers which contain epoxide groups.

The term "brominated epoxy polymers" refers to epoxy polymers containing within the repeating unit at least one bromine group. The polymers may or may not also be end-capped with bromine-containing groups.

As noted above, for use in textile applications, the formulation needs to be an aqueous dispersion, and therefore comprises an aqueous carrier.

Preferably, the aqueous carrier is water.

The term "aqueous dispersion", also known as latex, is understood to mean, for the purposes of the present invention, the dispersion of polymer in an aqueous carrier, such as water. The aqueous dispersion is usually characterized by a concentration of solids ranging from 20% by weight to 40% by weight. The solid content includes all the components of the formulations that are not the aqueous carrier, such as the flame-retardant (FR), binder, dispersing agent, flame retardant synergist, smoldering suppression agent, wetting agent, thickener etc.

As explained hereinabove, in order to obtain the formulations described herein, it has been found that the brominated epoxy polymer should preferably be grinded to a pre-determined size to provide particles having a size which is suitable to enable an effective flame retardation of the fibers. Generally, the particles would have to be smaller than the fiber size, namely smaller than 100 microns, more preferably equal to or smaller than 30 microns.

Thus, the coarse brominated epoxy polymer particles need to first be micronized before they can be used in the formation of the aqueous dispersions of the present invention. The particles may be micronized by a variety of milling techniques as known in the art, and include both dry milling and wet milling, as detailed further below, of the coarse brominated epoxy polymers particles.

The coarse brominated epoxy polymers particles are typically characterized by an upper "cut-off" of the particle size (largest particle size) which is about 300 microns, preferably a cut-off ranging from about 300 microns to about 270 microns and/or by a $d_{99}$ ranging from about 275 microns to about 100 microns and/or by a $d_{90}$ ranging from about 160 microns to about 60 microns and/or by a $d_{50}$ ranging from about 44 microns to about 22 microns.

The micronized particles of the present invention, obtainable by dry milling or wet milling of the brominated epoxy polymer coarse particles described above, are characterized by a "cut-off" of the particle size which is lower than 28 microns and by a $d_{99}$ which is lower than 25 microns, preferably lower than 18 microns and even lower than 15 microns. Yet preferably, the $d_{99}$ ranges from about microns to about 12 microns, more preferably the $d_{99}$ ranges from about 15 microns to about 13 microns.

Furthermore, the micronized particles of the present invention are characterized by a $d_{90}$ which is lower than 15 microns. Preferably, the $d_{90}$ ranges from about 15 microns to about 7.5 microns, more preferably the $d_{90}$ is lower than 7.5 microns, and ranges from about 7.5 microns to about 6.5 microns.

Yet further, the micronized particles of the present invention are characterized by a $d_{50}$ which is lower than 5 microns. Preferably, the $d_{50}$ ranges from about 5 microns to about 3 microns, more preferably the $d_{50}$ is lower than 3.5 microns and ranges from about 3.5 microns to about 3 microns.

Thus, according to preferred embodiments of the invention, the particle size of at least 99% of the brominated epoxy polymer particles ($d_{99}$) is smaller than about 25 microns, more preferably smaller than 15 microns. According to additional preferred embodiments of the invention, the particle size of at least 90% of the brominated epoxy polymer particles ($d_{90}$) is smaller than about 15 microns, more preferably smaller than 7.5 microns.

According to yet additional preferred embodiments of the invention, the particle size of at least 50% of the brominated epoxy polymer particles ($d_{50}$) is smaller than about 5 microns, more preferably smaller than 3.5 microns.

Without being bound to a specific theory, it is thought that achieving a particle size which is smaller or equal to the average diameter of the fibers of the flammable fabric, positively affects the FR finish transparency and smoothness.

Indeed, as can be seen in Example 1, the micronized brominated epoxy polymer particles used in the present invention were characterized to have a $d_{99}$<15 microns, a $d_{90}$<7.5 microns and a $d_{50}$<3.5 microns.

Thus, according to one preferred embodiment of the invention, the brominated epoxy polymers need to be milled to have a size distribution of $d_{50}$<5 micron and a $d_{90}$<15 micron and a $d_{99}$<25 micron, more preferably of $d_{50}$<3.5 micron, a $d_{90}$<7.5 micron and a $d_{99}$≤15 micron.

While a Tg lower than 200° C. and a molecular weight ranging from 1,000 to 20,000 grams/mol, are sufficient for application on some fabrics, it has been found that in order for the flame retardant formulation to be suitable for a variety of fabrics, including cotton, preferably the Tg should be lower than 160° C., preferably lower than 140° C. and even lower than 130° C.

Furthermore, preferably the molecular weight of the brominated epoxy polymers should range from 1,000 to 10,000 grams/mol, and even from 1,000 to 5,000 grams/mol.

For example, as can be seen in comparative table I below, summarizing the flammability properties a variety of fabrics coated with the brominated epoxy polymers of Table 1, it was unexpectedly found that of the entire F series only F-3020, F-3516 and F-2016 were suitable textile finishing application for all of the tested fabrics (100% cotton, 100% polyester and 50-50% cotton/polyester), whereas another brominated epoxy polymer flame retardant, such as F-2100, was found suitable for only some textile applications (on polyester and cotton/polyester blends), or necessitated the addition of flame retardant synergists for application on cotton.

It has been found that brominated epoxy polymers having higher Tg or higher molecular weight, cannot be easily milled and do not adhere well to some fabrics. For Example, F-2100 which has a Tg ranging from 180° C. to 205° C., was found to be suitable only for application on polyester or polyester/cotton fabrics. However, its successful application to 100% cotton fabrics required the addition of an anti-smoldering agent TexFRon AG.

Thus, according to one preferred embodiment of the present invention, there is provided a textile flame retardant formulation, in the form of an aqueous dispersion, comprising micronized particles of at least one brominated epoxy polymers having:
 a) a molecular weight ranging from 1,000 to 10,000 grams/mol; and
 b) a glass transition initiation temperature (Tg) that is lower than about 160° C.;
 and an aqueous carrier.

As shown in the Examples section below, F-2016, F-3516 and F-3020, which all have a Tg that is lower than 130° C., and a molecular weight ranging from 1,000 to 5,000 grams/mol, have been successful as textile flame retardants on 100% cotton, 100% polyester and 50-50% cotton/polyester fabrics. Furthermore, when F-2016 and F-3020 were applied to 50-50% cotton/polyester fabric according to the present disclosure, the fabrics were found to be UV stable with no significant yellowing after 100 hours under UV radiation.

Thus, according to another more preferred embodiment of the present invention, there is provided a textile flame retardant formulation, in the form of an aqueous dispersion, comprising micronized particles of at least one brominated epoxy polymers having:
 a) a molecular weight ranging from 1,000 to 5,000 grams/mol; and
 b) a glass transition initiation temperature (Tg) that is lower than about 130° C.;
 and an aqueous carrier.

In order to achieve a stable dispersion, it may be necessary to add a dispersing agent, or a similar agent, as known to a person skilled in the art.

Furthermore, preferably the aqueous carrier is in fact water.

Thus, according to one preferred embodiment of the invention, there is provided a textile flame retardant formulation, in the form of an aqueous dispersion, comprising micronized particles of at least one brominated epoxy polymers having:
 a) a molecular weight ranging from 1,000 to 5,000 grams/mol; and
 b) a glass transition initiation temperature (Tg) that is lower than about 130° C.;
water; and
a dispersing agent.

The formulations of the present invention typically contain a suitable flame retardant (noted as FR, or FR % throughout the specification), as detailed hereinabove, in an amount ranging from 10 to 30% by weight of the formulation. This corresponds to a bromine content ranging from 5% to 15% by weight of the formulation.

Thus, according to preferred embodiments of the invention, there are provided formulations comprising from 5% to 15% bromine by weight, more preferably from 5% to 10% by weight.

These amount of Br in the aqueous dispersion reflect a Br content on the fabric ranging from 10% to 33% by weight.

The flame retardant formulation described herein may further comprise one or more additives, selected from the group consisting of a flame retardant synergist, a smoldering suppressant agent, a surface active agent, an antifoaming agent, a preservative, a stabilizing agent, a binding agent, a thickening agent, a dispersing agent, a wetting agent, a suspending agent, a pH buffer, an anti creasing agent, a hardener, a curing agent, a sequestering agent, a detergent, a dye, a pigment and any mixture thereof.

For example, according to a preferred embodiment of the present invention, the flame retardant formulation described herein may further comprise a dispersing agent, a suspending agent or an emulsifying agent to help disperse or emulsify the flame retardant in the aqueous carrier. These agents are typically added in an amount of up to 5% by weight each.

Furthermore, although the brominated epoxy polymers of the present invention do not need a curing agent/crosslinker to react, in some cases it may be useful to add a hardener/curing agent, as known by any person skilled in the art.

Additionally, as can be seen in the Examples section below, the aqueous dispersions prepared in Examples 2, 7 and 9, often contains a binder, such as an acrylic binder, and a flame retardant synergist, such as antimony oxide.

In many examples, the formulation contains a binding agent that helps bind the FR to the fabric.

The term "binding agent", used interchangeably with the term "binder" refers to a crosslinkable polymeric adhesive used to bind materials to textile substrates.

Examples of binding agents include, but are not limited to, acrylic binding agents, vinyl acrylate binding agents, polyurethane binding agents and polyvinylchloride binding agents.

Preferably, the binding agent is an acrylic binding agent.

Examples of acrylic binding agents include, but are not limited to, homopolymer Acrylic, Butadiene Acrylonitrile Acrylic, methacrylic and styrene-acrylic.

As seen in the Examples which follow, the 50% diluted binding agent was present in the formulations in an amount ranging from 10% to 20% by weight of the formulation, corresponding to an actual solid binder content ranging from 5% to 10% by weight of the formulation.

According to yet another preferred embodiment of the invention, the formulation described herein comprises an additive which is a flame retardant synergist.

The term "flame retardant synergist" is used herein to indicate inorganic or organic compounds which enhance the effectiveness of flame retardants.

Examples of inorganic flame retardant synergists include, but are not limited to, metal oxides (for example, iron oxide, tin oxide, zinc oxide, aluminum trioxide, alumina, antimony trioxide and antimony pentoxide, bismuth oxide, molybdenum trioxide, and tungsten trioxide), zinc borate, antimony silicates, zinc stannate, zinc hydroxystannate, ferrocene and mixtures thereof. Examples of organic flame retardant synergists include, but are not limited to dicumyl (dimethyldiphenylbutane), polycumyl, halogenated paraffin, triphenylphosphate, and mixtures thereof.

Preferably, the flame retardant synergist is antimony oxide (ATO).

The molar ratio between antimony and bromine (Sb:Br) within the formulation has been surprisingly found to range from 1:3 to as low as 1:18.

Thus, according to some preferred embodiments of the invention, the Sb:Br molar ratio ranges from 1:3 to 1:18, more preferably it ranges from 1:9 to 1:12.

However, as noted in the Examples below, in some cases, it was possible to prepare, by exhaustion on some hydrophobic fibers such as polyester, formulations containing no synergist and no binder at all, without adversely affecting the properties of the textile.

In some other applications, for example when the treated fabric fails an after-glow test, an anti-smoldering agent is added to the formulation.

Thus, according to yet another preferred embodiment of the invention, the formulation comprises an additive which is a smoldering suppressant agent.

As used herein, the term "smoldering", also known in the art as "after-flame burning", refers to a burning which continues after the open flame has been extinguished. As used herein, the term "smoldering suppressant" also termed "smoldering suppressing" or "anti-smoldering" agent, compound, composition or formulation, describes a compound, a composition or a formulation, respectively, which is capable of reducing or eliminating the tendency of a substrate to burn after no longer being exposed to a flame.

Examples of suitable smoldering suppressants include, but are not limited to, polyphosphates, methyl phosphates phosphoric acid and boric acid salts.

Preferably, the smoldering suppressant is an aluminum phosphate salt.

The smoldering suppressant may be added in an amount ranging from 10% to 15% by weight, as is easily determined by a person skilled in the art.

According to additional preferred embodiments of the invention, the formulations described herein further comprise a wetting agent and/or a thickening agent. These agents are typically added in an amount of up to 5% by weight each.

Examples of suitable wetting agents, dispersing agents and thickeners are known in the field of textile flame retardation and can be easily determined by a person skilled in the art.

It should be clarified that the dry solid content of the formulations, as disclosed in Tables 2, 21-22 and 29 and ranges 25-40% by weight, is the total amount of all the solids which form part of the formulation. This includes the brominated epoxy polymers (FR) in an amount ranging 10-20% by weight, the binder in an amount ranging from 5% to 10% by weight, the dispersion agent in an amount of up to 5% by weight, a flame retardant synergist and a smoldering suppression agents, as well as any other solid components added to the formulation, such as wetting agent, thickener etc. In Table 33, when no binder or flame retardant synergist were added, the solid content reflect the amount of FR, dispersion agent and optionally other additives, and is therefore nearly equal to the amount of FR, ranging from 10 to 20% by weight.

The dispersions of the flame retardants of the present invention were found to be stable for at least 5 days under room temperature conditions, whereas no settling or separation of the dispersions was observed.

As noted hereinabove, the inventors have now developed a novel process for the preparation of the aqueous flame retardant dispersion comprising micronized particles of brominated epoxy polymers, as described herein.

Therefore, according to another aspect of the invention, there is now provided a process for the preparation of the textile flame retardant formulations described hereinabove, this process comprising:

a) obtaining coarse particles of brominated epoxy polymers having:
  i. a molecular weight ranging from 1,000 to 20,000 grams/mol; and
  ii. a glass transition initiation temperature (Tg) that is lower than about 200° C.;
b) Milling the coarse particles to obtain micronized particles having a size distribution of $d_{50}$<5 micron and a $d_{90}$<15 micron and a $d_{99}$<25 micron;
c) Preparing an aqueous solution comprising an aqueous carrier and a dispersing agent;
d) Adding the micronized particles to the aqueous solution, and mixing it for at least 30 minutes to obtain a mixed aqueous dispersion;
e) Optionally adding to the mixed aqueous dispersion a binder and/or a flame retardant synergist and/or a thickener and/or a smoldering suppression agent and/or a wetting agent, and mixing it for at least 15 more minutes.

Preferably the polymers have a molecular weight ranging from 1,000 to 10,000 grams/mol, more preferably from 1,000 to 5,000 grams/mol. Furthermore, preferably, the Tg is lower than about 160° C., more preferably lower than 130° C.

Other additives which are suitable for use in the present invention and have been described hereinabove, may further be added during the preparation of the formulation, either during step (e) or before it, as is known to a person skilled in the art.

As clearly apparent from the results, milling was essential to prepare the FR formulation of the present invention.

The milling could be affected either by wet milling or by dry milling.

Wet milling is defined as a milling step which is carried out in the presence of a liquid and can be conducted according to any of the known wet milling practices.

In particular, wet milling techniques comprise subjecting a liquid suspension of coarse particles to mechanical means, such as a dispersion mill, for reducing the size of the particle size. One example of a dispersion mill is a media mill, such as a bead mill. Wet bead milling involves preparing a suspension of pre-milled coarse particles. This dispersion is then drawn through a mill chamber containing a motor driven paddle and a quantity of grinding beads, to produce a finely milled suspension. A screen is used to retain the beads within the mill chamber whilst allowing the passage of product out of each mill chamber. Inline mixers may be used in the process line to break up milled/pre-milled agglomerates.

The mills used for wet or dry milling commonly employ toughened ceramic, stainless steel or tungsten carbide to form the mill chambers and agitating paddles. Commonly used grinding media include zirconium oxide beads, which have a hardness approaching that of diamonds, or considerably softer grinding media based on polystyrene or other similar polymers.

Other milling methods, besides bead milling, include using roll mills, pearl mills, vibro-energy milling, high pressure water jets, ultrasonics and orifice extrusion methods Wet-milling is sometimes used to avoid the problematic melting of particles and the formation of agglomerates which may occur during dry milling, in particular for compounds having relatively low melting temperatures.

Liquid media are preferred which do not dissolve the particles and which are non-flammable.

Milling media bodies useful for milling include balls, cylinders and other shapes of steel, corundum, porcelain, steatite, alumina, mixed oxides and quartz such as those having a diameter of from 0.05 to 20 mm. It has been found to be preferable to use a large number of fine milling balls, rather than fewer heavy balls. The finer balls perform a more efficient co-milling action. Preferably the balls have a diameter of 2 mm or less, and even 1.5 mm or less, under laboratory conditions. Larger milling balls may be required under industrial conditions.

Milling temperatures can be controlled for optimum performance of the media mill and brittleness of the milled solid and milling media, which can become more elastic and resistant to particle size reduction at higher temperatures. Milling temperatures can range from as low as liquid air, liquid nitrogen or liquid argon temperatures, but are more commonly from about −80° C. to about 50° C., well below the melting temperature of the particles being milled.

Milling is conducted under atmospheric pressure in laboratory conditions, but can be conducted under pressure in industrial conditions.

Preferably, the milling, under laboratory conditions, is conducted in a 0.6 liter continuous mill at a rate of 3-4 kg/hour, but higher rates are possible under industrial conditions, so as to achieve the desired particle size distribution.

The milling time is determined such that the main dispersion properties are obtained. In other words, milling is conducted until the particle size of at least 99% of the particles ($d_{99}$) is smaller than about 25 microns, preferably 15 microns and/or until the particle size of at least 90% of the particles ($d_{90}$) is smaller than about 15 microns, preferably 7.5 microns and/or until the particle size of at least 50% of the particles ($d_{50}$) is smaller than about 5 microns, preferably 3.5 microns. Hence, the milling time is from about 10 minutes to about an hour under laboratory conditions. Longer milling time is possible but not required.

According to another embodiment of the process according to this aspect of the present invention, prior to or subsequent to the milling, there is added to the dispersion at least one ingredient selected from the group consisting of a flame retardant synergist, a smoldering suppressant agent, a surface active agent, an antifoaming agent, a preservative, a stabilizing agent, a binding agent, a thickening agent, a wetting agent, a dispersing agent, a suspending agent, a pH buffer and any mixture thereof, as described hereinabove. It may be necessary at this stage to add more of the aqueous carrier/solvent.

These formulations can be efficiently used when applied on textiles, avoiding the need to use excessive amounts of the flame retardant, binders, synergists and other additives. Furthermore, these formulations are easily applied onto the textile substrate, while circumventing the need to use drastic conditions as in the methods for incorporating flame retardants in the melt (i.e. at high temperatures and under pressure, for example by extrusion or injection molding).

Thus, according to another aspect of the present invention there is provided a process of obtaining a flame retarded textile fabric.

The process, according to this aspect of the present invention, is affected by simply contacting a flammable textile fabric substrate with the flame retardant formulation described herein, whereby the contacting can be affected by any industrially acceptable manner. Subsequent to contacting the FR formulation, the substrate is heated to a temperature of from 140° C. to 180° C., preferably at about 160° C., whereby the temperature is dictated by the melting temperature of the flame retardant and by the curing temperature of the binding agent. The curing temperature is also related to the curing time and the treated substrate. Thus, for example, curing the present formulations on a glass substrate necessitated more time than on textiles at the same temperature (at 160° C., 15 minutes on glass compared to 4-6 minutes on fabric).

The industrially acceptable manner in which the contacting is affected includes, for example, spreading, coating, padding, dipping, printing, foaming and/or spraying the FR formulation onto the substrate. Padding is a process that is typically used for applying the formulation on a textile substrate and is defined as a process in which the fabric is first passed through a padder containing the FR formulation, and is then squeezed between heavy rollers to remove any excess formulation. The process described herein can be affected, for example, either during the dying or the finishing stages of the substrate manufacture.

As is demonstrated in the Examples section that follows, the formulations and processes described herein were practiced so as to provide substrates having the milled (micronized) brominated flame retardant formulations applied thereon.

Hence, according to a further aspect of the present invention there is provided an article-of-manufacture which comprises a flammable substrate and any of the flame retardant formulations described herein, being applied thereon.

As used herein, the term "substrate" describes an article which has a surface that can be beneficially coated (either wholly or partially) with a flame retardant formulation. Exemplary articles include, without limitation, textiles, wood, furniture, toys, bricks, electrical appliances, electrical cables, plastics and more.

As is used herein, the term "flammable substrate" describes a substrate, as described hereinabove, that easily ignites when exposed to a low-energy flame. The flammability of different articles-of-manufacture can be tested according to international standards.

Preferred substrates onto which the flame retardant formulations described herein can be beneficially applied are textile fabrics or "textile flammable substrate".

The flammability of the textile flammable substrates of the present invention was determined by a 12 seconds ignition test, which is defined by ASTM D-6413, a test method used to measure the vertical flame resistance of textiles. According to this method a textile is classified on a pass/fail basis, according to predetermined criteria, usually of the "after-flame time", "after-glow time" and "char length" of the tested sample.

An "after-flame time" is defined herein and in the art as the time period during which the sample continues to burn after removal of the burner.

An "after-glow time" is defined herein and in the art as the time period during which the sample glows after the flame is extinguished.

A "char length" is defined herein and in the art as the distance from the edge of the fabric that was exposed to the flame to the end of the area affected by the flame. A char is defined as a carbonaceous residue formed as the result of pyrolysis or incomplete combustion.

More specifically, a textile is considered to have failed the 12 seconds ignition test, if its average "char length" exceeds 7 inches (17.8 cm) or an individual sample has a "char length" longer than 10 inches (25.4 cm). The flammability of a substrate may be further defined by its "after-flame time" and by its "after-glow time". A fabric is considered to have an excellent flame retardancy if either its "after-flame time" is 10 seconds or less. A fabric is considered to have a superior flame retardancy if its "after-flame time" is 5 seconds or less.

Optionally, since a low "after-glow time" is advantageous, the preferred "after-glow" time is less than 200 seconds. However the flammability "pass/fail" is defined by the "after-flame" and "char length" only.

Using this method, it was demonstrated, for example, that padding either a bone-dry 100% cotton knitted fabric, or a 100% polyester fabric or a 50-50% cotton/polyester fabric with the micronized brominated epoxy polymers of the present invention, such as F-2016, F-3516 and F-3020, resulted in an "after flame" of 0-3 seconds.

Furthermore, the char length in all tested fabrics ranged from 10 to 11.5 cm for F-3516, from 10 to 15.8 cm for F-2016 and from 12.5 to 17 cm for F-3020.

Yet further, the "after-glow" was 0-2 seconds on polyester fabric, and ranged 59-130 seconds for a 50-50% cotton/polyester fabric. In some cases, for cotton, an anti smoldering agent may be added.

Thus, according to one preferred embodiment of the invention, the flame retardant textile fabric described herein has an "after flame" time ranging from 0 seconds to 5 seconds and/or a char length ranging from 10 to 17 cm.

As is further demonstrated in the Examples section that follows, when an FR formulations of the present embodiments was applied onto various textile fabrics, the flame resistance of the fabric, as defined by the "after-flame time", "after-glow time" and "char length", was obtained and maintained even after the fabric was contacted with hot water and a detergent, while being subjected to several washing cycles, as defined by Standard Laboratory Practice for Home Laundering (AATCC technical manual/2001). In fact, the flame resistance properties of textile fabrics treated with the FR formulations described herein were maintained even after the treated fabric was subjected to even 30 washing cycles.

Hence, it has been shown that the treated textile fabrics are characterized by enhanced washing fastness and that the flammable textile fabrics described herein have a durability of at least 15 washing cycles. More preferably the flame retardant textile fabrics of the present have a washing fastness of at least 25 laundry cycles and even of 30 laundry cycles.

The term "washing fastness", which is also referred to herein interchangeably as "washing durability" or "laundry stability", refers to the ability of a substrate treated with the milled formulations of the present invention, to maintain its characteristic flame resistance and/or textural and/or aesthetical properties, after being subjected to at least one washing cycle, as defined by Standard Laboratory Practice for Home Laundering (AATCC technical manual/2001).

As is well acceptable in the art, a textile is considered "durable" if it withstands 5 washing cycles without having remarkable change of a property thereof. The substrates treated with the formulations of the present embodiments were characterized by a washing fastness of 15, 20, 25 and even 30 washing cycles.

Furthermore, as detailed in the experimental section, the durability of the fabrics coated by the brominated epoxy formulations of the present invention, was demonstrated in a 8 hours boiling water extraction experiment. As displayed in FIG. 2, the test resulted in a transparent and clear extraction medium for the F-2016 and F-3020 samples, signifying that the Br adhered well to the fabric and did not detach from it during washing, and hence that the Br content in the extraction medium is below the detection limit, quite in contrast to the milky medium in a Deca Ethane reference sample, where the release of Br into the extraction medium is observed.

Hence, according to further embodiments of the present invention, the flammable textile fabrics described herein are characterized by a washing fastness of at least 5, 10, 15, 20, 25 and even 30 washing cycles. This feature is particularly notable in view of the relatively low amount of the binder in the applied formulation.

As discussed in the Background section hereinabove, textile flammability and textile smoldering are major concerns since textiles are used in all fields of life. Some textile-based articles of manufacture, such as garments, linen and some decorative or technical textiles, are subject to harsh usage (abrasion, exposure to various environmental conditions etc.) and therefore may need extensive, sometimes daily, cleaning and washing. Heretofore, fire proofing these articles of manufacture involved either using the few available non-flammable fabrics; coating flammable fabrics with large amounts of FR, thus often damaging the fabric properties; or applying low amounts of FR on the flammable fabric, but limiting its cleaning method to the expensive and burdensome dry cleaning method. Using the FR formulation presented herein, these garments or technical textiles may be fire proofed while maintaining the feel and look of the fabric, as a result of applying relatively small amounts of the formulation.

Other types of flammable textile fabrics, such as draperies, carpets, tents, sleeping bags, toys, wall fabrics, decorative fabrics, mattresses and upholsteries, are not washed as much as garments or linen. However, the major hazards that can be caused by the inherent flammability of these articles call for efficient fire proofing thereof, in addition to their durability during periodic cleaning. These articles of manufacture may easily be made fire proof, either by using a fabric treated by the formulation described herein during the manufacturing process, or by easily applying these formulations onto the final product.

The "article of manufacture" is preferably a textile fabric. The textile fabrics can be synthetic, natural or a blend thereof.

The terms "fabric", "textile" and "textile fabric" are used herein interchangeably to describe a sheet structure made from fibers.

The textile fabrics of this invention may be used as a single layer or as part of a multi-layer protective garment.

A textile substrate may be incorporated in various products, where it is desired to reduce the substrate flammability. Such products include, for example, draperies, garments, linen, mattresses, carpets, tents, sleeping bags, toys, decorative fabrics, upholsteries, wall fabrics, and technical textiles.

Suitable fabrics to be successfully flame retarded by the formulations of the present invention include those composed of both synthetic and natural fibers.

The term "fiber" as used herein refers to a natural or synthetic filament capable of being spun into a yarn or made into a fabric.

Exemplary fabrics include fabrics composed of fibers such as: wool, silk, cotton, linen, hemp, ramie, jute, acetate, lyocell, acrylic, polyolefin, polyamide, polylactic acid, polyester, rayon, viscose, spandex, metallic composite, ceramic, glass, carbon or carbonized composite, and any combination thereof.

The brominated epoxy polymers of the present invention were especially suitable to flame retard cotton, polyester and combinations thereof.

According to a preferred embodiment of the present invention, the flammable textile fabric of the present invention is characterized by an amount of a binding agent which is lower than 15 weight percentages of the total weight of the substrate, preferably lower than 10 weight percentages of the total weight of the substrate, and more preferably the amount of the binding agent ranges from about 5 weight percentages to 12 weight percentages of the total weight of the formulation.

These low amounts of binder allowed the textiles treated by the formulations of the present embodiments to maintain their desirable textural and aesthetical properties, as well as their flame retardancy, as compared to the untreated fabric.

In particular, it has been shown that textiles coated with the formulations described herein were characterized by feel and appearance similar to those of a non-treated fabrics. For example, properties such as the flexibility, smoothness and streak-free look of a non-treated textile were maintained upon application of the FR formulation. Furthermore, these textural and aesthetical properties were maintained also upon subjecting the treated fabrics to several washing cycles.

Thus, according to a preferred embodiment of the present invention, there is provided a flammable textile fabric which is characterized by at least one aesthetical or textural property which is substantially the same as that of said flammable textile fabric per se.

The phrase "flammable textile fabric per se" as used hereinafter, refers to a flammable textile fabric which was not treated with the flame retardant formulation.

One particularly important aesthetical property is the transparency of the coating. The milled formulations of the present embodiments have proven to be highly efficient in creating a uniform, homogeneous and transparent coating, which is both high in bromine and low in binder, and is therefore highly suitable to be used not only on white and back-coated textiles, but also on colored textiles, for which the degree of transparency of the coating is more critical.

These properties are maintained even after extensive washings. Thus, according to a preferred embodiment of the present invention, the flame-retarded textile fabric described herein has a durability of at least 10 washing cycles.

These flame-retarded textile fabrics were characterized by an after-flame time of less than 5 seconds and a char length of less than 15 centimeters, and optionally by an after-glow time of less than 10 seconds, and even less than 5 seconds, wherein the after-flame time, the after-glow time and the char length are all defined by ASTM D-6413 12 seconds ignition test.

The flame-retarded textile fabrics described herein are further characterized by an add-on which ranges 20% and higher was sometimes lower than 25% of the weight of the textile fabric per-se (see for example Table 10, Table 12 and Table 17). Moreover, in exhaustion experiments described below (see Example 12), the add-on was lower than 12%, ranging about 4-12%, and reflects the weight of the FR only on the fabric (no binder and no synergist in or on the fabric!).

As can be understood from the example above, in the case of fabrics treated by exhaustion, it was possible to obtain the excellent flame retardancy results even without using any FR synergist, such as ATO.

Therefore, according to a preferred embodiment of the present invention, there is provided a brominated epoxy polymer-flame-retarded textile fabric which is free of a flame retardant synergist.

Furthermore, in exhaustion applications, there was also no need to add any binder, since the exhaustion process introduces the FR particles into the fibers in the melt.

Thus, according to another preferred embodiment of the present invention, there is provided a brominated flame-retarded textile fabric which is free of a binding agent.

Thus, according to one specific embodiment of the present invention, there is now provided the flame retardant textile fabric described herein being free of a flame retardant synergist and free of a binding agent, and having an add-on lower than 12%.

As noted hereinabove, the fibers which are most suitable to be treated by exhaustion are hydrophobic fibers, and more specifically polyester fibers.

Given the binder-free and ATO-free nature of the fabrics treated by exhaustion, there is now provided, according to yet an additional aspect of the invention, a flame retarded hydrophobic fiber being free of a binding agent and/or free of a flame retardant synergist, such as antimony oxide. According to one embodiment of the invention, the hydrophobic fiber is selected from polypropylene, polyester and nylon. More preferably, the fiber is a polyester fiber.

According to another aspect of the invention, fabrics composed of these flame retarded hydrophobic fibers, are also provided.

As shown in the Examples which follow, the flame retardant textile fabric described herein had a transparent flame retardant film coated thereon.

Thus, according to yet another preferred embodiment of the present invention, the invention is suitable to treat a wide selection of fabrics, and is particularly suitable to treat colored fabrics.

Furthermore, this flammable textile fabric is also characterized by a relatively low amount of binder, since the applied formulation contained less than 15% binder of the total weight of the formulation, mostly ranging from 5% to 10% by weight.

The formulations described herein may be applied onto the flammable textile fabric by contacting the fabric with the flame retardant formulation described herein and heating this flammable textile fabric, preferably to between 70° C. and 180° C., thereby curing it and hence flame retarding it.

According to a preferred embodiment of the present invention, contacting the fabric with the FR formulations of the present invention may be affected by spreading, coating, padding, dipping, printing, foaming and/or spraying.

The most preferred application methods are coating, spraying, dipping and padding.

The term "coating" as used herein, refers to the process of producing a generally continuous film or layer of a FR over, under or on both sides of the fabric surfaces.

Dipping refers to the immersion of a textile into a processing liquid, typically used in connection with a padding process.

Padding may be achieved by passing the textile between squeeze rollers, the bottom of which carries the composition to be applied, or by passing the textile through a bath and subsequently through squeeze rollers, the squeeze rollers acting to remove the excess composition.

Spraying occurs when the textile substrate is passed beneath a row of spray nozzles that apply the composition to the surface of the textile.

Coating, spraying, dipping and padding are conventional methods of treating textiles whereby a dispersion (if the FR is solid at room temperature) or emulsion (if the FR is liquid at room temperature) of the flame retardant is prepared and then applied onto the fabric.

A disadvantage of flame retardation by coating, spraying, dipping or padding is often the need to apply the protective coating in large amounts and/or add high amounts of binders to adhere the flame retardant to the fabric (commonly termed "high add-on") in order to obtain the required flame-resistant characteristics. Often, such high add-on adversely affects otherwise desirable aesthetical and textural properties of the fabric. For example, upon application of a FR, fabrics may become stiff and harsh and may have duller shades and poor tear strength and abrasion properties. One way to overcome this disadvantage is to coat only the back surface of the fabric, a process commonly termed as "back-coating", which is most suitable in the case of draperies, furniture upholstering garments and linen.

It has now been found out that the flame retardant formulations of the present invention may effectively flame retard cotton fabrics treated by coating or back-coating while using relatively small amounts of binder either with or without the addition of FR synergists.

As noted hereinabove, the brominated epoxy polymers of the present invention are low melt FRs, having an affinity to polyester fibers. This allows penetration into the polyester component of cotton/polyester blend fabrics and thereby reduces the need for ATO. For example, while the recommended Sb/Br ratio for deca ethane is 1:3, it is now possible to decrease the Sb/Br ratio to 1:6, 1:9, 1:12, 1:15 and even 1:18 (See examples 8 and 10). However, reduction of Sb/Br molar ratio beyond 1:9 may require more bromine to pass flammability testing.

One strategy to reduce the use of ATO in textile formulation and smoldering is the application of combined Br/P formulations. The two combined FR mechanisms (gas phase and solid phase) enable reduction of ATO requirement for satisfactory performance and smoldering control. Therefore, the combination of an aluminum phosphate salt (TexFRon™ AG) with the brominated epoxy polymers of the present invention was tested in aim of reducing the ATO content in the formulations of the present invention to Sb/Br molar ratio of 1:12 in 50/50 Cotton/Polyester fabrics and to 1:6 in 100% cotton fabrics. The results are presented in Examples 8-10, and demonstrate that the ATO ratio can be reduced significantly (up to 1:6) without increasing total Br on the fabric and resulting in an increased efficiency. The addition of the aluminum phosphate salt (TexFRon™ AG) allows decrease of Sb/Br ratio even further (up to 1:9) without increasing Br requirement. Smoldering in cotton was also dramatically reduced to 2 to 4 seconds (compared to 30 seconds without). Durability was enhanced due to the low melt flow of the brominated epoxy polymers of the present invention and efficient coating of the fibers.

As shown in the Examples section which follows, different textile fabrics were successfully flame retarded by a variety of application methods, when using the brominated epoxy polymer flame retardant formulations of the present invention.

Thus, according to another aspect of the invention, there is provided a flame retarded textile fabric, either coated or exhausted by the brominated epoxy polymers of the present invention.

These textile fabrics were found to have superior properties compared with the presently known FR-treated textile products.

Some of the polymeric brominated FRs of the present invention have a low melting point (105-120° C.) and high affinity towards polyester and other hydrophobic fibers, which allows simple coating of textile substrates by application from an aqueous dispersion without a binder and subsequent drying and thermal curing in a process termed exhaustion. As shown in Example 12, using these FRs by exhaustion precludes the need to add both a binder or an ATO synergist in the formulation, since the hydrophobic FR diffuses into the hydrophobic polyester polymer structure and is trapped inside the polyester fibers so that durability to laundry is excellent. Both F-2016 and F-3020 were applied using a pad-cure application where the fabric was padded by the FR dispersion and was then cured under conditions that allowed diffusion into the polyester fiber. Blends with cotton may also be treated with the addition of low levels of binder and ATO.

As shown in Table 12, it has now been surprisingly found by the present inventors that flame retardation can also be affected by using exhaustion. Both F-2016 and F-3020 demonstrated excellent flame retardation as a dispersed penetrant in polyester even at 160° C. Add-on was far lower (7-12%) compared to the add-ons used for customary coating applications (mostly 25% and higher). No ATO and acrylic binder were required and the treated fabric remained soft and smooth. No blotching, streaking or white marks were observed. Furthermore, it was now determined that using the micronized particles of the brominated epoxy polymers of the present invention, it was now possible to achieve exhaustion under relatively mild conditions, at regular curing temperatures of about 160° C., in contrast to the high temperatures usually associated with exhaustion processes in other FRs.

The term "exhaustion" is used herein to describe the transfer or molecular diffusion of the FR from the emulsion, dispersion or suspension in which it is dispersed, to the fibers of the fabric immersed in this emulsion, dispersion or suspension, and subsequently drying this fabric. This term includes both complete and incomplete consumption of the emulsion or suspension.

Therefore, according to yet another embodiment of the present invention the contacting is affected by exhaustion of the formulation into the fabric.

Textile fabrics most suitable for treatment by exhaustion are fabrics composed of hydrophobic fibers, such as polyester fibers. Exhaustion is used with phosphorus-based FRs, such as Avocet™ products, for the treatment of polyester.

Exhaustion may be affected by using any conventional machinery for treating textiles and garments with liquors, including dollies, winches, beam dyeing equipment, jets, package dyeing machinery, hank dyeing machinery, top dyeing equipment, side paddle dyeing machines, continuous dye ranges, thermosoling machines, washing and laundering equipment and dry cleaning machinery for batchwise treatments and including pad mangles, lick-rollers, spray units, continuous cloth washing units, back washing machines and solvent scouring machines for continuous and semi-continuous treatments.

Usually, exhaustion onto polyester is practiced in industry as a continuous process (thermosol) where the fabric is first saturated with a dispersion and continues on-line into a high temperature (>180° C., usually at about 190-205° C.) continuous oven where the diffusion into the fibers takes place.

It has now been unexpectedly found that applying the flame retardant formulations of the present invention by exhaustion at relatively mild conditions, namely lower than 180° C., and as low as 160° C. (regular curing conditions) results in just as effective flame retardation of the fabrics, while circumventing the need to use any binder.

As shown in Example 12, both F-2016 and F-3020 clearly demonstrated excellent flame retardation as compared to traditional pad/cure application, as a dispersed penetrant in polyester even at 160° C. Add-on was far lower (4-12%) compared to the add-ons used for customary coating applications (usually 25-40% and higher). No ATO and acrylic binder were required. The treated fabric remained soft and smooth. No blotching, streaking or white marks were observed. XRD showed good penetration into the fiber with minimal surface deposition. Flame resistance testing shows no deterioration of flammability performance of both F-2016 and F-3020 after 5 laundry cycles.

In particular, it is noted that while in regular exhaustion processes, a relatively high temperature load is needed to "open" the polyester fiber and allow the FR to penetrate it, it has now been demonstrated that regular curing temperatures of about 160° C. were sufficient to allow the exhaustion of the present FRs into the polyester fiber.

Without being bound to a specific theory, in the absence of a textile binder, the flame retardant particles of the present invention, are incorporated into the hydrophobic fibers in the melt, and rather than being adhered to the surface of the fabric by the binder. In particular, during the exhaustion process, when a binder is not added, the flame retardant padded onto the fabric surface diffuses into the fiber polymer bulk and does not remain on the surface as in binder-based coating application, where some of the FR stays bound to the surface due to the action of the binder.

Furthermore, using exhaustion to treat flammable fabrics also circumvents the need to use any flame retardant synergist, such as antimony-based compounds (although adding them is still possible) and therefore according to a preferred embodiment of the present invention, there are provided flame retardant formulations and flame retardant fabrics, which are completely free of flame retardant synergists.

Optionally, the exhaustion may be conducted simultaneously with dyeing the fabric, by adding at least one dye during the exhaustion, for example into the dyeing machine. This presents an additional advantage in that flame retardation and dyeing can be affected in one step, lowering the costs of operation, and simplifying textile treatment.

According to yet another aspect of the invention, there is now provided a use of the micronized brominated epoxy polymers described herein in textile finishing applications.

The term "textile finishing" refers to the processes used in order to impart the required functional properties to a fiber or fabric. As used herein the term relates mostly to chemical finishing, in particular flame retarding a textile fabric.

These FRs can be used to achieve flame retarded fabrics having improved esthetical and textural properties, at relatively low binder and FR synergist, and maintaining a high washing durability on a variety of fabrics.

The FRs of the present invention are suitable being applied by padding, coating, spraying or other conventional contacting options, as described hereinabove.

In addition, given the possibility of using exhaustion, the micronized particles of the brominated epoxy polymers described herein may be suitable to use on fabrics composed of hydrophobic fibers, such as polyolefins (for example polypropylene), polyester and polyamide (such as nylon).

Additional objects, advantages, and novel features of the present invention will become apparent to one ordinarily skilled in the art upon examination of the following examples, which are not intended to be limiting. Additionally, each of the various embodiments and aspects of the present invention as delineated hereinabove and as claimed in the claims section below finds experimental support in the following examples.

EXAMPLES

Figure 1:
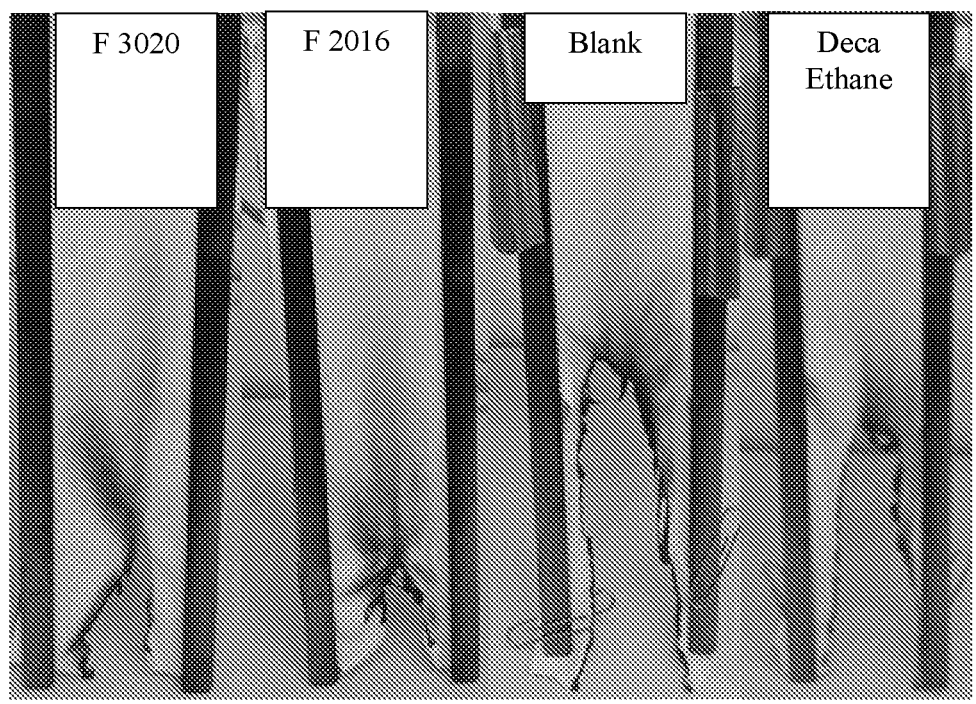
FIG. 1 shows test results for an ignition test for F-3020 and F-2016 and samples as well as Deca ethane and a blank.
Figure 2:
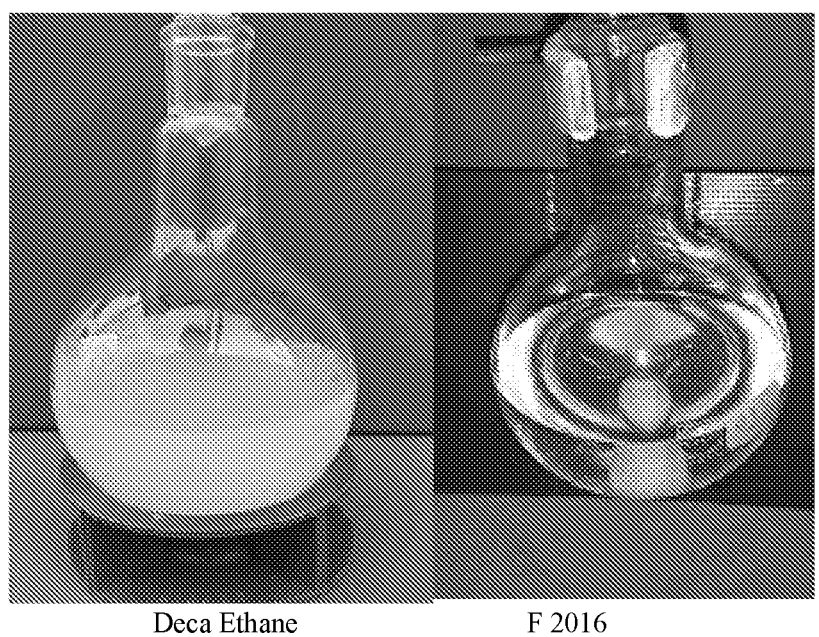
FIG. 2 shows a transparent and clear extraction medium for F-2016 and a milky medium for Deca ethane medium as obtained from the durability test of the treated fabrics after 8 hours in boiling water.

Reference is now made to the following examples, which together with the above descriptions, illustrate the invention in a non limiting fashion.

Throughout the examples, the terms "polyester fabric", "cotton fabric" etc. refer to fabrics composed of polyester fibers, cotton fibers, respectively.

Materials and Analytical Methods

Materials:
Brominated epoxy polymers of the F-series: F-2100, F-2100L, F-2016, F-2400, F-3020 and F-3516 (as detailed in Table 1) were obtained from ICL-IP.
Disperbyk 2010 dispersing agent (Structured acrylate copolymer with pigment affinic groups) was obtained from BYK Additives and Instrument
Tersperse 2735 dispersing agent (2-Propenoic acid, 2-methyl-, polymer with ethenylbenzene) was obtained from Huntsman
Supragil WP wetting agent (a sodium alkylnaphthalene-sulfonic acid-formaldehyde condensate) was obtained from Rhodia
Morwet EFW wetting agent (diisobutyl naphthalene sulfonate) was obtained from AkzoNobel
CELLOSIZE HEC QP-100MH thickener (hydroxyethylcellulose) was obtained from DOW.
Antimony trioxide (ATO, CAS No. 1309-64-4) was obtained from Campine Belgium.
AC-170 binder (Diazenedicarboxamide) and GP acrylic thickening agent were obtained from B. G. Polymers. The acrylic binders are typically supplied as 50% solids emulsions.
TexFRon™ AG (Aluminum ammonium polyphosphate) 90% solid, was obtained from ICL-IP, Beer Sheva Israel.

Light Scattering Particle Size Measurement:
This method was used to determine the particle size distribution of liquid particles, using a Malvern Mastersizer (Hydrogel 2000G), manufactured by Malvern Instruments. The instrument uses the principle of MIE scattering, has an accuracy of ±1%, and is set to measure particles in the size range 0.02-2000 microns. A spherical (general) model was used. The surface mean particle size ($d_{50}$) or 50 percentile, the 99 percentile ($d_{99}$) and the 90 percentile ($d_{90}$) are directly obtained from the data generated by the instrument.

Fabric Characterization Methods:
Scanning electron microscope (SEM) equipped with an energy dispersive x-ray spectrometer (EDS; hereinafter SEM/EDS) was performed on a JEOL JSM-7400F ultrahigh resolution cold FEG-SEM. In this method a piece of fabric is coated with 10 nanometer of gold layer.

The percentage of bromine on the fabric was determined by adding tetrahydrofuran (THF) and extracting the coating from fabric specimens weighing 0.5 grams each. Each specimen is reacted with a sodium biphenyl complex reagent, to produce NaBr in an amount equivalent to the amount of bromine in the sample. The access reagent is treated with isopropanol and acidified with acetic acid. Finally, the amount of bromine is determined using a titration with $AgNO_3$.

Extraction Experiments to Demonstrate Durability
In order to demonstrate the durability of the brominated epoxy formulations of the present invention, treated fabric samples were extracted in boiling water in a Soxhlet apparatus for 8 hours. The resultant extract was evaluated visually and analytically, both for the samples of the present invention and in comparison with a Deca Ethane reference.

The percentage of additives on the fabric ("Add-on") was determined by the difference between sample weight before and after application of the FR formulation and drying thereof (deviation of ±1%).

Flammability Tests:
ASTM D 6413 12 seconds ignition test: In this method, samples are cut from the fabric to be tested, and are mounted in a frame that hangs vertically from inside the flame chamber. A controlled flame is exposed to the sample for a specified period of time (in this case for 12 seconds, one of the strictest flammability tests), and the "after-flame time" and the "after-glow time" are both recorded. Finally, the sample is torn by use of weights and the char length is measured. To pass, the average char length of five samples cannot exceed 7 inches (17.8 cm). In addition, none of the individual specimens can have a char length of 10 inches (25.4 cm). The sample is further classified as passing the test if its "after-flame time" is less than 5 seconds.

For some applications, an "after-glow" time of less than 200 seconds, and even less than 150 seconds, is advantageous so as to render the sample applicable even in the stricter "children's nightwear" flammability standards.

Fabrics are tested in both directions (warp and fill) i.e. 5 samples are cut along the length and 5 samples are tested along their width.

Test Results are displayed in FIG. 1. Deca Ethane was used as reference and blank show significant dripping.

Washing Fastness Tests:
Samples treated with formulations described herein were subjected to at least 5 successive washing cycles in accordance with the washing procedure set forth below, followed by one drying cycle in accordance with commonly used drying procedure, based on the Standard Laboratory Practice for Home Laundering (AATCC technical manual/2001).

In all washing cycles, the temperature of the washing water is maintained between 58° C. and 62° C., for automatic washing machines, the washing cycle is set for normal washing cycle, and a synthetic detergent that conforms to Standard Laboratory Practice for Home Laundering (AATCC technical manual/2001) is used.

Example 1

Preparation of Micronized F-2016, F-2100, F-3020 and F-3516

Coarse F-2016, F-2100, F-3020 and F-3516 were micronized by a Micronizer Jet Mill (wet milling) or by a ball mill (dry milling). The particle size distribution before and after the milling was measured using Malvern Mastersizer 2000 in water (3 minutes ultrasonic treatment, 500 psi, 1250 rpm).

For F-2400 and F-3100 milling was impossible due to hardness of the material and therefore no size reduction was obtained.

Example 2

Preparation of F-2016, F-2100, F-3020 and F-3516 Aqueous Dispersions

F-2100 (96 grams) having a size distribution of $d_{50}$<3.5 micron $d_{90}$<7.5 micron $d_{99}$<15 micron was added to a mixed solution of deionized water (443.8 grams), dispersing agent Tersperse 2735 (5 grams) and wetting agent Morwet EFW (0.5 grams). The dispersion was allowed to mix for thirty minutes. $Sb_2O_3$ (30.4 grams) and acrylic binder AC-170 (75.8 grams) were added to the mixed dispersion and the dispersion was allowed to mix for fifteen minutes and thickened by adding a small amount of hydroxyethylcellulose (1.7 grams).

The same process was repeated for F-2016, F-3020 and F-3516, whereas the dispersing agent was Disperbyk 2010 and the wetting agent was Supragil WP. The compositions of the different aqueous dispersions are detailed in Table 2 below:

TABLE 2

| Composition Properties | F-2100 | F-2016 | F-3020 | F-3516 |
| --- | --- | --- | --- | --- |
| | (wt %) in deionized water | | | |
| Dry solids | 26 | 27 | 27 | 28 |
| FR | 14.7 | 16.1 | 15.6 | 16.88 |
| Br | 7.7 | 8.1 | 8.7 | 9.1 |
| Acrylic binder AC-170 | 5.8 | 5.25 | 5.25 | 5.6 |
| $Sb_2O_3$ | 4.7 | 4.9 | 5.3 | 5.12 |
| Dispersion agent | 1 | 1 | 1 | 1 |
| | Tersperse 2735 | Disperbyk 2010 | Disperbyk 2010 | Disperbyk 2010 |
| Wetting Agent | 0.1 | 0.1 | 0.1 | 0.1 |
| | Morwet EFW | Supragil | Supragil WP | Supragil WP?? |
| Thickener: Hydroxyethylcellulose | 0.15-0.2 | 0.15-0.2 | 0.15-0.2 | 0.15-0.2 |

Example 3

Application of F-2100 Formulation on Fabrics (Padding)

3A) Application on a 50%/50% Cotton Polyester Fabric

A 50%/50% cotton/polyester fabric weighing 205 grams per square meter was treated by padding with the F-2100 dispersion prepared in Example 2. Fabrics were cured at 160° C. for 4 minutes, laundered 5 times according to AATCC Standard Practice for Home Laundry at 60° C., bone dried and tested according to ASTM D 6413-08 vertical flame, 12 seconds ignition.

i) Results for high shear wet milled F-2100 samples at about 32-34% dry add-on and at a 3:1 Br:Sb molar ratio are provided in Table 3:

TABLE 3

| | | | | | flammability test | | | |
| --- | --- | --- | --- | --- | --- | --- | --- | --- |
| Sample # | % Add-on | % FR | % Br | % ATO | After flame sec | After Glow sec | Char Length cm | Laundry Cycles |
| 2103-52-02 | 32.9 | 19 | 12.9 | 6 | 2 | 90 | 16 | 5 |
| 2103-52-03 | 34.4 | 19.9 | 13.5 | 6.3 | 2 | 67 | 15 | 5 |
| 2103-52-04 | 26.6 | 15.3 | 10.4 | 4.8 | 0 | 95 | 15 | Before laundry |
| | | | | | 2 | 95 | 15 | 5 |
| 2103-52-06 | 35.0 | 20.2 | 13.7 | 6 | 2 | 70 | 16 | 5 | ii) Results for dry-milled F-2100 samples having an add-on ranging from 24-34% at a Br:Sb molar ratio of 3:1 are provided in Table 4:

TABLE 4

| | | | | | flammability test | | | |
| --- | --- | --- | --- | --- | --- | --- | --- | --- |
| Sample # | % Add-on | % FR | % Br | % ATO | After flame sec | After Glow sec | Char Length cm | Laundry Cycles |
| 2103-64-02 | 26.1 | 14.8 | 10.1 | 4.7 | 1 | 128 | 15 | Before laundry |
| | | | | | 2 | 56 | 15 | 5 |
| 2103-64-03 | 24 | 13.6 | 9.3 | 4.3 | 0 | 134 | 15.5 | Before laundry |
| | | | | | 2 | 50 | 16 | 5 |
| 2103-64-04 | 26.5 | 15.1 | 10.2 | 4.8 | 0 | 70 | 15 | Before laundry |
| | | | | | 1 | 65 | 15 | 5 |
| 2103-64-05 | 29.4 | 16.7 | 11.3 | 5.3 | 1 | 143 | 15.5 | Before laundry |
| | | | | | 1 | 40 | 15 | 5 |
| 2103-64-06 | 25.7 | 14.6 | 9.9 | 4.6 | 0 | 88 | 14 | Before laundry |
| | | | | | 1 | 60 | 15 | 5 |
| 2103-64-07 | 25.7 | 14.6 | 9.9 | 4.6 | 0 | 110 | 15 | Before laundry |
| | | | | | 0 | 60 | 14 | 5 |
| 2103-64-08 | 30.5 | 17.3 | 11.8 | 5.5 | 0 | 90 | 15 | Before laundry |
| | | | | | 1 | 75 | 15 | 5 |
| 2103-64-09 | 33.8 | 19.2 | 13 | 6.1 | 0 | 134 | 16 | Before laundry |
| | | | | | 1 | 65 | 15 | 5 |

3B) Application on a 100% Cotton Fabric

A 100% cotton knit 220 grams/m² fabric was padded with the F-2100 dispersion of Example 2, having a 39-47% dry add-on at a Br:Sb molar ratio of 3:1. Fabrics were cured at 160° C. for 4 minutes, laundered 5 times according to AATCC Standard Practice for Home Laundry at 60° C., bone dried and tested according to ASTM D 6413-08 vertical flame, 12 seconds ignition. As can be seen in Table 5, it passed the flammability tests but failed the laundry durability test (flammability after laundry):

TABLE 5

| | | | | | flammability test | | | |
| --- | --- | --- | --- | --- | --- | --- | --- | --- |
| Sample # | % Add-on | % FR | % Br | % ATO | After flame sec | After Glow sec | Char Length cm | Laundry cycles |
| 2103-72-07 | 39.7 | 22.5 | 11.7 | 7.1 | 0 | 162 | 9 | Before laundry |
| | | | | | BEL | | | 5 |
| 2103-72-08 | 41.5 | 23.5 | 12.2 | 7.4 | 0 | 160 | 7.5 | Before laundry |
| | | | | | BEL | | | 5 |
| 2103-72-09 | 46.7 | 26.5 | 13.8 | 8.4 | 0 | 160 | 7.5 | Before laundry |
| | | | | | BEL | | | 5 |
| 2103-72-10 | 44.5 | 25.2 | 13.1 | 8 | 0 | 158 | 8.5 | Before laundry |
| | | | | | BEL | | | 5 |
| 2103-72-11 | 45.1 | 25.6 | 13.3 | 8.1 | 0 | 120 | 6.5 | Before laundry |
| | | | | | BEL | | | 5 |

BEL = burnt entire length

3C) Application on a 100% Polyester Fabric

A 100% polyester fabric weighing 200 treated by padding with the dispersion of Example 2, 30-47% dry add-on at a 3:1 Br:Sb molar ratio. Fabrics were cured at 160° C. for 4 minutes, laundered 5 times according to AATCC Standard Practice for Home Laundry at 60° C., bone dried and tested according to ASTM D 6413-08 vertical flame, 12 seconds ignition. As can be seen in Table 6, it passed the flammability tests and also passed the laundry durability test (flammability after laundry) above 8.8% Br:

TABLE 6

| Sample # | % Add-on | % FR | % Br | % ATO | After flame sec | After Glow sec | Char Length cm | Laundry cycles |
|---|---|---|---|---|---|---|---|---|
| 2103-72-02 | 45 | 25 | 13.3 | 8.1 | 0 | 8 | 12 | Before laundry |
| | | | | | 0 | 0 | 11 | 5 |
| 2103-72-03 | 40 | 22.8 | 11.8 | 7.2 | 0 | 5 | 13.5 | Before laundry |
| | | | | | 0 | 0 | 9 | 5 |
| 2103-72-04 | 30.9 | 17.5 | 9.1 | 5.5 | 0 | 5 | 13.5 | Before laundry |
| | | | | | 0 | 0 | 14 | 5 |
| 2103-72-05 | 29.7 | 16.8 | 8.8 | 5.3 | 0 | 9 | 13 | Before laundry |
| | | | | | 0 | 0 | 11 | 5 |
| 2103-72-06 | 47.1 | 26.7 | 13.9 | 8.4 | 0 | 8 | 11.1 | Before laundry |
| | | | | | 0 | 0 | 11 | 5 |

Example 4

Application of F-2016 Formulation on Fabrics (Padding)

4A) Application on a 50%/50% Cotton/Polyester Fabric

50%/50% cotton polyester fabric weighing 205 grams per square meter was treated by padding with the F-2016 dispersion prepared according to Example 2. Fabrics were cured at 160° C. for 4 minutes, laundered 5 times according to AATCC Standard Practice for Home Laundry at 60° C., bone dried and tested according to ASTM D 6413-08 vertical flame, 12 seconds ignition.

i) Results for high shear wet milled samples, at 32-34% dry add-on and at a 3:1 Br:Sb molar ratio, are provided in Table 7:

TABLE 7

| Sample # | % Add-on | % FR | % Br | % ATO | After flame sec | After Glow sec | Char Length cm | Laundry Cycles |
|---|---|---|---|---|---|---|---|---|
| 1979-74-03 | 34.92 | 20.76 | 10.4 | 6.30 | 0 | 53 | 17 | Before laundry |
| | | | | | 2 | 30 | 17 | 5 |
| 1979-74-04 | 32 | 19.03 | 9.52 | 5.78 | 0 | 74 | 17 | Before laundry |
| | | | | | 5 | 20 | 22 | 5 |
| 1979-74-05 | 32.88 | 19.55 | 9.78 | 5.94 | 1 | 58 | 16 | Before laundry |
| | | | | | 2 | 31 | 18 | 5 | ii) Results for dry milled samples, at 25-36% dry add-on and at a 3:1 Br:Sb molar ratio, are provided in Table 8:

TABLE 8

| Sample # | % Add-on | % FR | % Br | % ATO | After flame sec | After Glow sec | Char Length cm | Laundry Cycles |
|---|---|---|---|---|---|---|---|---|
| 1979-81-10 | 31.5 | 19.2 | 9.6 | 5.8 | 0 | 38 | 14 | Before laundry |
| | | | | | 0 | 58 | 13 | 5 |

TABLE 8-continued

| Sample # | % Add-on | % FR | % Br | % ATO | After flame sec | After Glow sec | Char Length cm | Laundry Cycles |
|---|---|---|---|---|---|---|---|---|
| 1979-81-11 | 35.8 | 21.9 | 10.9 | 6.6 | 0 | 42 | 15.5 | Before laundry |
| | | | | | 0 | 42 | 10.5 | 5 |
| 1979-81-12 | 25.2 | 15.4 | 7.7 | 4.7 | 0 | 33 | 13.5 | Before laundry |
| | | | | | 0 | 68 | 10 | 5 |
| 1979-81-13 | 33.8 | 20.6 | 10.3 | 6.3 | 0 | 30 | 14 | Before laundry |
| | | | | | 0 | 83 | 10 | 5 |

Sample 1979-81-13, having a 33.8% add-on, 20.6% FR, 10.3% Br, 6.3% ATO and at a Br:Sb molar ratio of 3:1, was then further tested after up to 30 laundry cycles according to AATCC Standard Practice for Home Laundry at 60° C. Results are presented in Table 9:

TABLE 9

| Sample # | After flame sec | After Glow sec | Char Length cm | Laundry Cycles |
|---|---|---|---|---|
| 1979-81-13 | 0 | 30 | 14 | Before laundry |
| 2169-36-13 | 0 | 36 | 13.5 | 5 |
| 2169-36-01 | 0 | 28 | 13 | 10 |
| 2169-36-16 | 0 | 30 | 11 | 15 |
| 2169-36-10 | 2 | 34 | 13 | 25 |
| 2169-36-15 | 2 | 35 | 14 | 30 |

Figure 3:
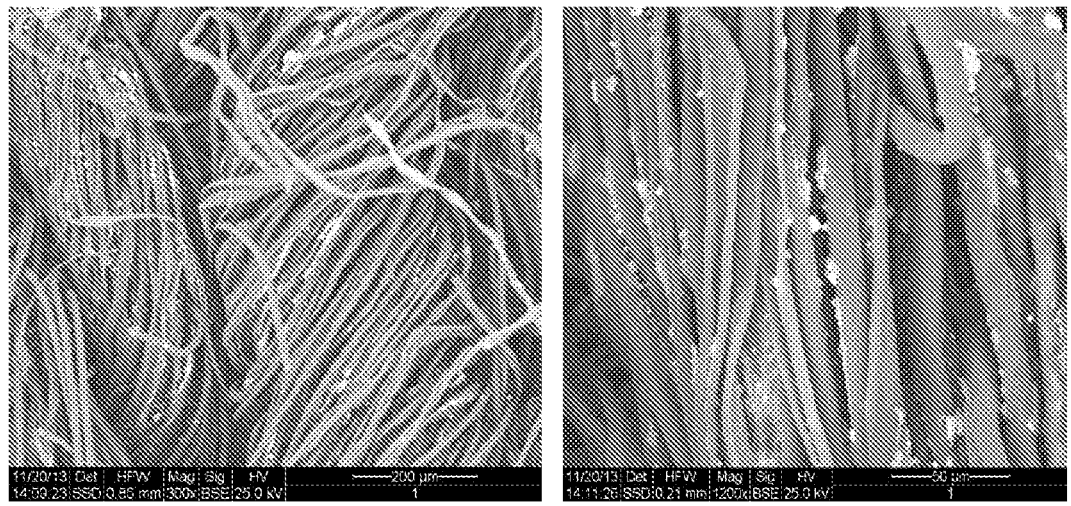
FIG. 3 shows a SEM micrograph of the 50/50 polyester/cotton surface after curing and 15 laundry cycles according to Example 4.

FIG. 3 is a SEM micrograph of the 50/50 polyester/cotton surface after curing and 15 laundry cycles. White specs are identified as ATO by XRD. F-2016 shows as an invisible clear film on the cotton fibers and penetrates into the polyester fiber.

4B) Application on a 100% Cotton Fabric, with and without TexFRon AG Smoldering Suppressant A 100% cotton knit 220 grams/m² fabric was padded with the F-2016 dispersion of Example 2. Fabrics were cured at 160° C. for 4 minutes, laundered 5 times according to AATCC Standard Practice for Home Laundry at 60° C., bone dried and tested according to ASTM D 6413-08 vertical flame, 12 seconds ignition.

i) Results for the F-2016 dispersion of Example 2 (no TexFRon AG) at 23-26% dry add-on and at a 3:1 Br:Sb molar ratio, are provided in Table 10:

TABLE 10

| Sample # | % Add-on | % FR | % Br | % ATO | After flame sec | After Glow sec | Char Length cm | Laundry Cycles |
|---|---|---|---|---|---|---|---|---|
| 1979-81-14 | 23.2 | 14.2 | 7.1 | 4.3 | 0 | 544 | 12 | Before laundry |
| | | | | | 0 | 561 | 11.5 | 5 |
| 1979-81-15 | 25.3 | 15.5 | 7.7 | 4.7 | 0 | 459 | 13.5 | Before laundry |
| | | | | | 0 | 359 | 11 | 5 |

TABLE 10-continued

|  |  |  |  |  | flammability test | | | |
|---|---|---|---|---|---|---|---|---|
| Sample # | % Add-on | % FR | % Br | % ATO | After flame sec | After Glow sec | Char Length cm | Laundry Cycles |
| 1979-81-16 | 26.4 | 16.1 | 8.1 | 4.9 | 0 | 520 | 12.5 | Before laundry |
|  |  |  |  |  | 0 | 523 | 10 | 5 | ii) Results for the F-2016 dispersion of Example 2 after combining it with TexFRon AG (50%-50% wt) at a 3:1 Br:Sb molar ratio, whereby the add-on increased to 48-65%, are provided in Table 11:

TABLE 11

|  |  |  |  |  |  | flammability test | | |
|---|---|---|---|---|---|---|---|---|
| Sample # | % Add-on | % FR | % Br | % ATO | Br:Sb Molar ratio | After flame sec | After Glow sec | Char Length cm |
| 2103-89-02 | 65.1 | 26.7 | 13.4 | 8.1 | 3:1 | 0 | 12 | 10 |
| 2103-89-01 | 56.2 | 23.1 | 11.5 | 7 | 3:1 | 0 | 18 | 12 |
| 2103-89-05 | 48.6 | 19.9 | 10.0 | 6.1 | 3:1 | 0 | 12 | 12.5 |

% FR as appears throughout the specification refers to the % wt of the brominated FRs of the present invention on the fabric.

4C) Application on a 100% Polyester Fabric

A 100% polyester fabric weighing 200 treated by padding with the F-2016 dispersion of Example 2, at a 22-35% dry add-on and a 3:1 Br:Sb molar ratio. Fabrics were cured at 160° C. for 4 minutes, laundered 5 times according to AATCC Standard Practice for Home Laundry at 60° C., bone dried and tested according to ASTM D 6413-08 vertical flame, 12 seconds ignition. Results are provided in Table 12:

TABLE 12

|  |  |  |  |  | flammability test | | | |
|---|---|---|---|---|---|---|---|---|
| Sample # | % Add-on | % FR | % Br | % ATO | After flame sec | After Glow sec | Char Length cm | Laundry Cycles |
| 1979-81-17 | 21.8 | 13.3 | 6.7 | 4.0 | 0 | 0 | 10.5 | Before laundry |
|  |  |  |  |  | 0 | 0 | 10.5 | 5 |
| 1979-81-18 | 32.9 | 20.1 | 10.1 | 6.1 | 0 | 0 | 11.5 | Before laundry |
|  |  |  |  |  | 0 | 0 | 10 | 5 |
| 1979-81-19 | 35.1 | 21.5 | 10.7 | 6.5 | 0 | 0 | 11 | Before laundry |
|  |  |  |  |  | 0 | 0 | 11 | 5 |

Sample 1979-81-18 having a 32.9% add-on, 20.1% FR, 10.1% Br, 6.1% ATO and at a 3:1 Br:Sb molar ratio was then further tested after up to 25 laundry cycles according to AATCC Standard Practice for Home Laundry at 60° C. Results are presented in Table 13:

TABLE 13

|  | flammability test | | | |
|---|---|---|---|---|
| Sample # | After flame sec | After-glow sec | Char Length cm | laundry cycles |
| 1979-81-18 | 0 | 0 | 11.5 | Before laundry |
| 1979-81-18 | 0 | 0 | 10 | 5 |
| 2169-38-01 | 0 | 0 | 9 | 10 |
| 2169-38-05 | 0 | 0 | 7.5 | 15 |
| 2169-38-08 | 0 | 0 | 10 | 20 |
| 2169-38-07 | 0* | 0 | 10 | 25 |

*dripping

Figure 4:
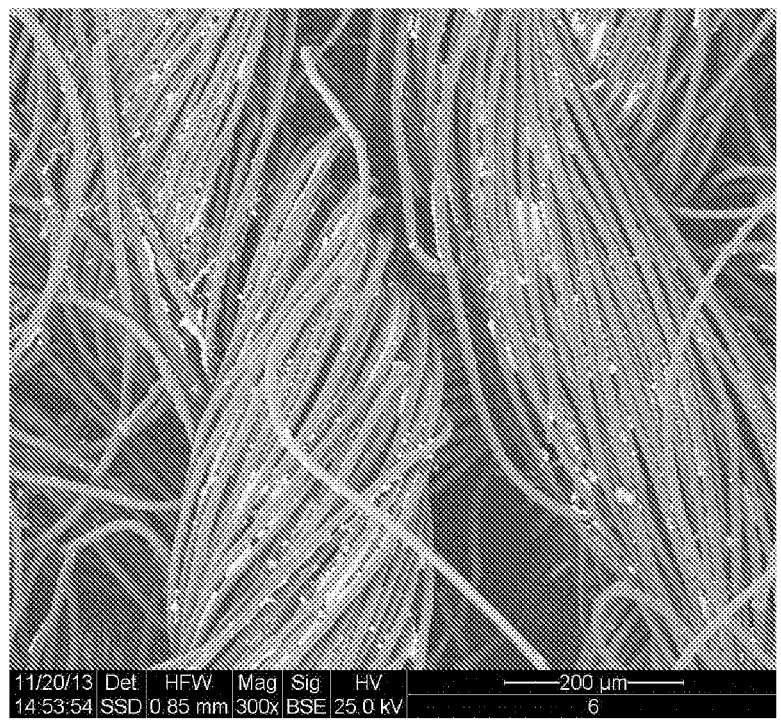
FIG. 4 is a SEM micrograph of the polyester surface coated by the 2016 FR before curing according to Example 4.
Figure 5:
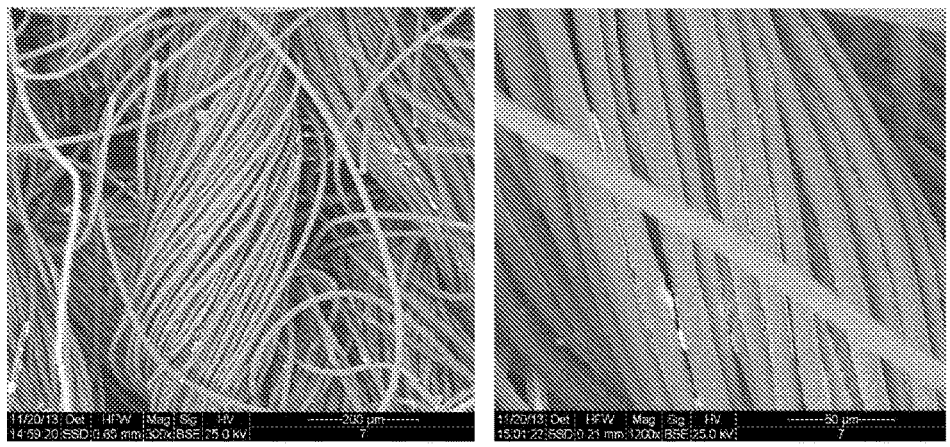
FIG. 5 is a SEM micrograph of the polyester surface coated by the 2016 FR after curing, showing penetration of the particles into the fiber according to Example 4.

FIG. 4 is a SEM micrograph of the polyester surface coated by the 2016 FR before curing, while FIG. 5 is a SEM micrograph of the polyester surface coated by the 2016 FR after curing, showing penetration of the particles into the fiber. The white spots in the micrographs indicate ATO particles.

Figure 6:
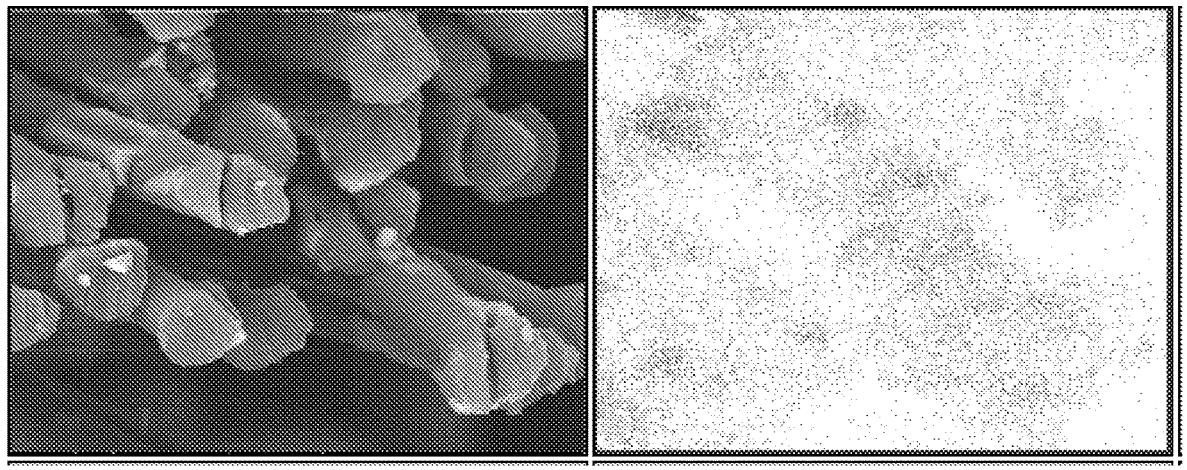
FIG. 6 is a SEM micrograph of a cross section of the polyester fabric after thermal curing of F-2016 coating, showing penetration of the bromine into the fiber according to Example 4.

FIG. 6 is a SEM micrograph of a cross section of the polyester fabric after thermal curing of F-2016 coating, showing penetration of the Bromine into the fiber.

In a soxhlet extraction experiment on an F-2016 sample, it was observed that while before the extraction the after-flame was 0 seconds, the after-glow was 63 seconds, and the char length was 14 cm, after the 8-hr extraction in boiling water, the after-flame was still 0 seconds, the after-glow was 36 seconds, and the char length was 13.5 cm. Furthermore, the Br content in the extraction medium was below detection level and the medium was clear and transparent.

Example 5

Application of F-3020 Formulation on Fabrics (Padding)

5A) Application on a 50%/50% Cotton Polyester Fabric

A 50%/50% cotton polyester fabric weighing 205 grams per square meter was treated by padding with the F-3020 dispersion of Example 2. Fabrics were cured at 160° C. for 4 minutes, laundered 5 times according to AATCC Standard Practice for Home Laundry at 60° C., bone dried and tested according to ASTM D 6413-08 vertical flame, 12 seconds ignition.

i) Results for high shear wet milled samples, at 29-32% dry add-on at a 3:1 Br:Sb molar ratio, are provided in Table 14:

TABLE 14

|  |  |  |  |  | flammability test | | | |
|---|---|---|---|---|---|---|---|---|
| Sample # | % Add-on | % FR | % Br | % ATO | After flame sec | After Glow sec | Char Length cm | Laundry Cycles |
| 1979-73-13 | 31.71 | 18.35 | 10.3 | 6.24 | 1 | 68 | 15 | Before laundry |
|  |  |  |  |  | 3 | 42 | 17 | 5 |
| 1979-74-04 | 31.89 | 18.68 | 10.44 | 6.35 | 1 | 58 | 16 | Before laundry |
|  |  |  |  |  | 2 | 47 | 15 | 5 |
| 1979-74-05 | 29.44 | 17.33 | 9.64 | 5.89 | 1 | 74 | 16 | Before laundry |
|  |  |  |  |  | 2 | 75 | 15 | 5 | ii) Results for dry milled samples, at 27-33% dry add-on and at a 3:1 Br:Sb molar ratio, are provided in Table 15:

TABLE 15

| Sample # | % Add-on | % FR | % Br | % ATO | flammability test After flame sec | After Glow sec | Char Length cm | Laundry Cycles |
|---|---|---|---|---|---|---|---|---|
| 1979-81-01 | 28.0 | 16.7 | 9.3 | 5.7 | 0 | 94 | 16 | Before laundry |
|  |  |  |  |  | 0 | 80 | 13.5 | 5 |
| 1979-81-02 | 33.2 | 19.7 | 11.1 | 6.7 | 0 | 56 | 13 | Before laundry |
|  |  |  |  |  | 0 | 66 | 15 | 5 |
| 1979-81-03 | 27.4 | 16.3 | 9.1 | 5.5 | 0 | 68 | 14.0 | Before laundry |
|  |  |  |  |  | 0 | 58 | 13.5 | 5 |
| 1979-81-04 | 32.1 | 19.1 | 10.7 | 6.5 | 0 | 63 | 14.5 | Before laundry |
|  |  |  |  |  | 0 | 71 | 14.5 | 5 |

Sample 2169-41-02, having a 31.5% add-on, 18.2% FR, 10.2% Br, 6.2% ATO and a 3:1 Br:Sb molar ration, was then further tested after up to 30 laundry cycles according to AATCC Standard Practice for Home Laundry at 60° C. Results are provided in Table 16:

TABLE 16

| Sample # | flammability test After flame sec | After-glow sec | Char Length cm | Laundry Cycles |
|---|---|---|---|---|
| 2169-41-05 | 0 | 44 | 12 | 5 |
| 2169-41-04 | 0 | 32 | 11 | 10 |
| 2169-41-03 | 0 | 46 | 15 | 15 |
| 2169-41-06 | 1 | 54 | 16 | 20 |
| 2169-41-07 | 0 | 47 | 15 | 30 |

5B) Application on a 100% Cotton Fabric

A 100% cotton knit 220 grams/m² fabric was padded with the dispersion of F-3020 prepared in Example 2 at about 22-23% dry add-on and at a 3:1 Br:Sb molar ratio. Fabrics were cured at 160° C. for 4 minutes, laundered 5 times according to AATCC Standard Practice for Home Laundry at 60° C., bone dried and tested according to ASTM D 6413-08 vertical flame, 12 seconds ignition. Results are shown in Table 17:

TABLE 17

| Sample # | % Add-on | % FR | % Br | % ATO | flammability test After flame sec | After Glow sec | Char Length cm | Laundry Cycles |
|---|---|---|---|---|---|---|---|---|
| 1797-81-05 | 23.1 | 13.7 | 7.7 | 4.7 | 0 | 601 | 16.5 | Before laundry |
|  |  |  |  |  | 0 | 473 | 13 | 5 |
| 1979-81-06 | 22.1 | 13.2 | 7.4 | 4.5 | 0 | 534 | 17 | Before laundry |
|  |  |  |  |  | 0 | 581 | 12.5 | 5 |

TextFron AG was added as in Example 4B to successfully overcome the smoldering effect.

5C) Application on a 100% Polyester Fabric

A 100% polyester fabric weighing 200 treated by padding with the D-3020 dispersion of Example 2, at a 34% dry add-on and at a 3:1 Br:Sb molar ratio. Fabrics were cured at 160° C. for 4 minutes, laundered 5 times according to AATCC Standard Practice for Home Laundry at 60° C., bone dried and tested according to ASTM D 6413-08 vertical flame, 12 seconds ignition. Results are provided in Table 18:

TABLE 18

| Sample # | % Add-on | % FR | % Br | % ATO | flammability test After flame sec | After Glow sec | Char Length cm | Laundry cycles |
|---|---|---|---|---|---|---|---|---|
| 1979-81-07 | 26.5 | 15.8 | 8.8 | 5.4 | 0 | 0 | 16 | Before laundry |
|  |  |  |  |  | 0 | 0 | 12 | 5 |
| 1979-81-08 | 17.3 | 10.3 | 5.8 | 3.5 | 0 | 0 | 13.5 | Before laundry |
|  |  |  |  |  | 0 | 0 | 15 | 5 |
| 1979-81-09 | 29.5 | 17.5 | 9.8 | 6.0 | 0 | 0 | 13.5 | Before laundry |
|  |  |  |  |  | 0 | 0 | 15.5 | 5 |

In a soxhlet extraction experiment on an F-3020 sample, it was observed that while before the extraction the after-flame was 0 seconds, the after-glow was 42 seconds, and the char length was 15 cm, after the 8-hr extraction in boiling water, the after-flame was still 0 seconds, the after-glow was 32 seconds, and the char length was 13.5 cm. Furthermore, the Br content in the extraction medium was below detection level and the medium was clear and transparent.

Example 6

Application of F-3516 Formulation on Fabrics

6A) Application on a 50%/50% Cotton Polyester Fabric

A 50%/50% cotton polyester fabric weighing 205 grams per square meter was treated by padding with the F-3516 dispersion of Example 2. Fabrics were cured at 160° C. for 4 minutes, laundered 5 times according to AATCC Standard Practice for Home Laundry at 60° C., bone dried and tested according to ASTM D 6413-08 vertical flame, 12 seconds ignition. Results for high shear wet milled samples, at 27-38% dry add-on at a 3:1 Br:Sb molar ratio, are provided in Table 19:

TABLE 19

| Sample # | % Add-on | % FR | % Br | % ATO | flammability test After flame sec | After Glow sec | Char Length cm | Laundry cycles |
|---|---|---|---|---|---|---|---|---|
| 2169-32-01 | 35.7 | 20.8 | 10.4 | 6.8 | 0 | 103 | 11 | Before laundry |
|  |  |  |  |  | 0 | 100 | 12.5 | 5 |
| 2169-32-02 | 38.2 | 22.3 | 11.2 | 7.3 | 0 | 74 | 13 | Before laundry |
|  |  |  |  |  | 0 | 68 | 13 | 5 |
| 2169-32-04 | 27.2 | 15.9 | 7.9 | 5.2 | 0 | 130 | 13.5 | Before laundry |
|  |  |  |  |  | 3 | 150 | 18 | 5 |
| 2169-32-05 | 35.9 | 21 | 10.5 | 6.9 | 0 | 62 | 11 | Before laundry |
|  |  |  |  |  | 0 | 70 | 12 | 5 |

6B) Application on a 100% Polyester Fabric

A 100% polyester fabric weighing 200 treated by padding with the F-3516 dispersion of Example 2, at 28-46% dry add-on and at a 3:1 Br:Sb molar ratio. Fabrics were cured at 160° C. for 4 minutes, laundered 5 times according to AATCC Standard Practice for Home Laundry at 60° C., bone dried and tested according to ASTM D 6413-08 vertical flame, 12 seconds ignition. Results are provided in Table 20:

TABLE 20

| | | | | | flammability test | | |
|---|---|---|---|---|---|---|---|
| Sample # | % Add-on | % FR | % Br | % ATO | After flame sec | After Glow sec | Char Length cm | Laundry cycles |
| 2169-33-01 | 38 | 22.2 | 11.1 | 7.3 | 0 | 0 | 10 | Before laundry |
| | | | | | 1 | 1 | 11 | 5 |
| 2169-33-02 | 41.3 | 24.1 | 12.1 | 7.9 | 1 | 1 | 11.5 | Before laundry |
| | | | | | 0 | 0 | 11 | 5 |
| 2169-33-03 | 28.5 | 16.6 | 8.3 | 5.4 | 1 | 1 | 11 | Before laundry |
| | | | | | 0 | 0 | 11 | 5 |
| 2169-33-04 | 37.7 | 22 | 11 | 7.2 | 0 | 0 | 11 | Before laundry |
| | | | | | 0 | 0 | 10.5 | 5 |
| 2169-33-05 | 45.9 | 26.8 | 13.4 | 8.8 | 2 | 2 | 11.5 | Before laundry |
| | | | | | 1 | 1 | 11.5 | 5 |

Example 7

Preparation of Reduced Antimony F-2016 Formulations

F-2016 formulations were prepared as described above in Example 2, having a solid content of about 25-40%, while lowering the Sb:Br molar ratio from 1:3 to 1:18. The various formulations are provided in Table 21:

TABLE 21

| Composition Properties | 1979-73 | 2195-63 | 2169-91 | 2195-03 | 2195-09 | 2195-10 |
|---|---|---|---|---|---|---|
| Dry solids (wt %) | 28 | 27 | 38.2 | 34 | 32 | 32 |
| FR (wt %) | 16.88 | 18.17 | 26.6 | 24.4 | 23.33 | 23.55 |
| Br (wt %) | 9.1 | 9.08 | 13.3 | 12.2 | 11.7 | 11.8 |
| $Sb_2O_3$ (wt %) | 5.12 | 2.76 | 2.7 | 1.8 | 1.4 | 1.2 |
| Sb:Br (molar) | 1:3 | 1:6 | 1:9 | 1:12 | 1:15 | 1:18 |
| Dispersion Agent (wt %) | 0.83 | 0.83 | 1.2 | 1.0 | 0.98 | 0.98 |

Additional F-2016 formulations were prepared by adding TexFRon AG (50% F-2016+50% TexFRon AG).

TABLE 22

| Composition Properties | 2120-07 | 2120-08 | 2120-12 |
|---|---|---|---|
| (wt %) | 38 | 38 | 40 |
| FR (wt %) | 12.3 | 13.2 | 14.2 |
| Br (wt %) | 6.15 | 6.6 | 7.2 |
| % TexFRon AG | 12.3 | 12.3 | 14.2 |
| $Sb_2O_3$ (wt %) | 3.7 | 2 | 1.43 |
| Sb:Br (molar) | 1:3 | 1:6 | 1:9 |

Example 8

Application of Reduced Antimony F-2016 Formulations on a 50/50 Polyester/Cotton Fabric (Padding)

The F-2016 reduced-antimony aqueous dispersions prepared according to Example 7 were applied to 50/50 Polyester/Cotton 200 gr/m² by padding. Fabrics were cured at 160° C. for 4 minutes, bone dried and tested. Several replications were tested for the various combinations. Treated fabrics were tested according to ASTM D 6413-08 vertical flame, 12 seconds ignition. At least 3 samples were burned for each test/formulation. Results are provided in Tables 23-28 below:

A) For a Br:Sb molar ratio is 3:1 i) without TexFRon AG, at an add-on of 25-36%, results are presented in Table 23i:

TABLE 23i

| | | | | | flammability test | | |
|---|---|---|---|---|---|---|---|
| Sample # | % Add-on | % FR | % Br | % ATO | After flame sec | After Glow sec | Char Length cm | Laundry cycles |
| 1979-81-10 | 31.5 | 19.2 | 9.6 | 5.8 | 0 | 38 | 14 | Before laundry |
| | | | | | 0 | 58 | 13 | 5 |
| 1979-81-11 | 35.8 | 21.9 | 10.9 | 6.6 | 0 | 42 | 15.5 | Before laundry |
| | | | | | 0 | 42 | 10.5 | 5 |
| 1979-81-12 | 25.2 | 15.4 | 7.7 | 4.7 | 0 | 33 | 13.5 | Before laundry |
| | | | | | 0 | 68 | 10 | 5 |
| 1979-81-13 | 33.8 | 20.6 | 10.3 | 6.3 | 0 | 30 | 14 | Before Laundry |
| | | | | | 0 | 36 | 13.5 | 5 | ii) with TexFRon AG (50%+50%), at an add-on of 50-61% results are provided in Table 23ii:

TABLE 23ii

| | | | | | flammability test | | |
|---|---|---|---|---|---|---|---|
| Sample # | % Add-on | % FR | % Br | % ATO | After flame sec | After Glow sec | Char Length cm | Laundry cycles |
| 2120-07-10 | 60.7 | 19.7 | 9.8 | 6.0 | 0 | 2 | 6 | Before laundry |
| 2120-07-10 | 60.7 | 19.7 | 9.8 | 6.0 | 0 | 2 | 6.5 | 5 |
| 2120-07-11 | 58.1 | 18.8 | 9.4 | 5.7 | 0 | 2 | 11 | Before laundry |
| 2120-07-11 | 58.1 | 18.8 | 9.4 | 5.7 | 0 | 3 | 10 | 5 |
| 2120-07-12 | 49.8 | 16.1 | 8.1 | 4.9 | 0 | 3 | 11 | Before laundry |
| 2120-07-12 | 49.8 | 16.1 | 8.1 | 4.9 | 0 | 4 | 17 | 5 |
| 2120-07-13 | 51.1 | 16.1 | 8.3 | 5.0 | 0 | 3 | 13 | Before laundry |
| 2120-07-13 | 51.1 | 16.1 | 8.3 | 5.0 | 0 | 3 | 13 | 5 |

B) For a Br:Sb molar ratio of 6:1 i) without TexFRon AG, at an add-on of 23-36%, results are presented in Table 24i:

TABLE 24i

| | | | | | flammability test | | |
|---|---|---|---|---|---|---|---|
| Sample # | % Add-on | % FR | % Br | % ATO | After flame sec | After Glow sec | Char Length cm | Laundry cycles |
| 2195-63-02 | 33 | 22.2 | 11.1 | 3.4 | 0 | 25 | 12 | Before laundry |
| | | | | | 0 | 20 | 13.5 | 5 |
| 2195-63-02 | 26.2 | 17.7 | 8.8 | 2.7 | 0 | 26 | 13.5 | Before laundry |
| | | | | | 2 | 34 | 15 | 5 |

TABLE 24i-continued

| Sample # | % Add-on | % FR | % Br | % ATO | After flame sec | After Glow sec | Char Length cm | Laundry cycles |
|---|---|---|---|---|---|---|---|---|
| 2195-63-03 | 32.2 | 21.7 | 10.8 | 3.3 | 0 | 40 | 11 | Before laundry |
|  |  |  |  |  | 0 | 32 | 11 | 5 |
| 2195-63-04 | 23.7 | 15.9 | 8.0 | 2.4 | 0 | 22 | 11.5 | Before laundry |
|  |  |  |  |  | 2 | 23 | 11.5 | 5 |
| 2195-63-05 | 27.3 | 18.4 | 9.2 | 2.8 | 0 | 28 | 12 | Before laundry |
|  |  |  |  |  | 0 | 21 | 12.5 | 5 |
| 2195-63-06 | 35.6 | 24 | 12 | 3.6 | 0 | 24 | 11 | Before laundry |
|  |  |  |  |  | 0 | 24 | 12.5 | 5 | ii) with TexFRon AG (50%+50%), at an add-on of 57-62% results are provided in Table 24ii:

TABLE 24ii

| Sample # | % Add-on | % FR | % Br | % ATO | After flame sec | After Glow sec | Char Length cm | Laundry cycles |
|---|---|---|---|---|---|---|---|---|
| 2120-08-08 | 59.74 | 20.6 | 10.3 | 3.1 | 0 | 3 | 12 | Before laundry |
|  |  |  |  |  | 0 | 4 | 14 | 5 |
| 2120-08-11 | 60.7 | 21.0 | 10.5 | 3.2 | 0 | 1 | 14 | Before laundry |
|  |  |  |  |  | 0 | 2 | 10 | 5 |
| 2120-08-12 | 62.6 | 21.7 | 10.9 | 3.3 | 0 | 0 | 7 | Before laundry |
|  |  |  |  |  | 0 | 1 | 6.5 | 5 |
| 2120-08-10 | 56.8 | 19.7 | 9.9 | 3.0 | 0 | 2 | 14 | Before laundry |
|  |  |  |  |  | 0 | 2 | 13 | 5 |

C) For a Br:Sb molar ratio of 9:1
  i) without TexFRon AG, at an add-on of 28-35%, results are presented in Table 25i:

TABLE 25i

| Sample # | % Add-on | % FR | % Br | % ATO | After flame sec | After Glow sec | Char Length cm | Laundry cycles |
|---|---|---|---|---|---|---|---|---|
| 2195-64-01 | 30.2 | 21.2 | 10.6 | 2.1 | 0 | 24 | 13.5 | Before laundry |
|  |  |  |  |  | 1 | 20 | 14.5 | 5 |
| 2195-64-02 | 35.1 | 24.0 | 12.0 | 2.4 | 0 | 26 | 13.5 | Before laundry |
|  |  |  |  |  | 1 | 25 | 15 | 5 |
| 2195-64-03 | 31.9 | 22.4 | 11.2 | 2.3 | 0 | 30 | 12 | Before laundry |
|  |  |  |  |  | 4 | 27 | 17.5 | 5 |
| 2195-64-4 | 27.8 | 19.6 | 9.8 | 2 | 0 | 32 | 13.5 | Before laundry |
|  |  |  |  |  | 2 | 24 | 14 | 5 |
| 2195-64-05 | 32.9 | 23.2 | 11.6 | 2.3 | 0 | 26 | 11.5 | Before laundry |
|  |  |  |  |  | 1 | 26 | 15 | 5 |
| 2195-64-6 | 33.4 | 23.5 | 11.8 | 2.4 | 0 | 28 | 12.5 | Before laundry |
|  |  |  |  |  | 0 | 25 | 15.5 | 5 | ii) with TexFRon AG (50%+50%), at an add-on of 59-69% results are provided in Table 25ii:

TABLE 25ii

| Sample # | % Add-on | % FR | % Br | % ATO | After flame sec | After Glow sec | Char Length cm | Laundry cycles |
|---|---|---|---|---|---|---|---|---|
| 2120-12-02 | 59.0 | 21.0 | 10.5 | 2.1 | 0 | 2 | 12 | Before laundry |
|  |  |  |  |  | 0 | 2 | 12.5 | 5 |
| 2120-12-03 | 56.2 | 20.0 | 10.0 | 2.0 | 0 | 3 | 7 | Before laundry |
|  |  |  |  |  | 0 | 3 | 7 | 5 |
| 2120-12-07 | 64.9 | 23.0 | 11.5 | 2.3 | 0 | 2 | 9 | Before laundry |
|  |  |  |  |  | 0 | 2 | 11.5 | 5 |
| 2120-12-01 | 68.9 | 24.5 | 12.2 | 2.5 | 0 | 2 | 11 | Before laundry |
|  |  |  |  |  | 0 | 5 | 15 | 5 |

D) For a Br:Sb molar ratio of 12:1 at an add-on of 37-42%, results are presented in Table 26:

TABLE 26

| Sample # | % Add-on | % FR | % Br | % ATO | After flame sec | After Glow sec | Char Length cm | Laundry cycles |
|---|---|---|---|---|---|---|---|---|
| 2195-03-02 | 38.9 | 28.0 | 14.0 | 2.1 | 0 | 33 | 14 | Before laundry |
| 2195-03-02 | 38.9 | 28.0 | 14.0 | 2.1 | 0 | 24 | 12.5 | 5 |
| 2195-03-03 | 36.8 | 26.5 | 13.3 | 2.0 | 0 | 30 | 13 | Before laundry |
| 2195-03-03 | 36.8 | 26.5 | 13.3 | 2.0 | 0 | 24 | 15 | 5 |
| 2195-01-01 | 42.2 | 30.4 | 15.2 | 2.3 | 0 | 34 | 15 | Before laundry |
| 2195-01-01 | 42.2 | 30.4 | 15.2 | 2.3 | 0 | 22 | 12 | 5 |
| 2195-01-04 | 40.1 | 28.9 | 14.4 | 2.2 | 0 | 31 | 13 | Before laundry |
| 2195-01-04 | 40.1 | 28.9 | 14.4 | 2.2 | 0 | 21 | 10 | 5 |

E) For a Br:Sb molar ratio of 15:1 at an add-on of 37-43%, results are presented in Table 27:

TABLE 27

| Sample # | % Add-on | % FR | % Br | % ATO | After flame sec | After Glow sec | Char Length cm | Laundry cycles |
|---|---|---|---|---|---|---|---|---|
| 2195-09-01 | 38.5 | 28.1 | 14.1 | 1.7 | 0 | 25 | 15 | Before laundry |
| 2195-09-01 | 38.5 | 28.1 | 14.1 | 1.7 | 2 | 15 | 14 | 5 |
| 2195-09-02 | 42.6 | 31.2 | 15.6 | 1.9 | 0 | 20 | 8 | Before laundry |
| 2195-09-02 | 42.6 | 31.2 | 15.6 | 1.9 | 2 | 14 | 15 | 5 |
| 2195-09-04 | 37.1 | 27.1 | 13.5 | 1.6 | 0 | 21 | 15.5 | Before laundry |
| 2195-09-04 | 37.1 | 27.1 | 13.5 | 1.6 | BEL |  |  | 5 |

BEL = burnt entire length

F) For a Br:Sb molar ratio of 18:1 at an add-on of 34-42%, results are presented in Table 28:

TABLE 28

| Sample # | % Add-on | % FR | % Br | % ATO | flammability test After flame sec | After Glow sec | Char Length cm | Laundry cycles |
|---|---|---|---|---|---|---|---|---|
| 2195-10-02 | 33.8 | 24.9 | 12.5 | 1.3 | 1 | 26 | 16 | Before laundry |
| 2195-10-02 | 33.8 | 24.9 | 12.5 | 1.3 | BEL | | | 5 |
| 2195-10-03 | 42.1 | 31.0 | 15.5 | 1.6 | 3 | 22 | 17 | Before laundry |
| 2195-10-03 | 42.1 | 31.0 | 15.5 | 1.6 | 8 | 28 | 13 | 5 |
| 2195-10-05 | 41 | 30.2 | 15.1 | 1.5 | | | | Before laundry |
| 2195-10-05 | 41 | 30.2 | 15.1 | 1.5 | 6 | 26 | 16 | 5 |
| 2195-10-06 | 36.1 | 26.6 | 13.3 | 1.3 | BEL | | | Before laundry |

Example 9

Preparation of Reduced Antimony F-3020 Formulations

F-3020 formulations were prepared as described above in Example 2, having a solid content of about 25-40%, while lowering the Sb:Br molar ratio from 1:3 to 1:9. The various formulations are provided in Table 29:

TABLE 29

| Composition Properties | Sample 1 | Sample 2 | Sample 3 |
|---|---|---|---|
| Dry solids (wt %) | 27 | 27 | 27 |
| FR (wt %) | 15.61 | 17.9 | 19.3 |
| Br (wt %) | 8.74 | 10.01 | 10.9 |
| $Sb_2O_3$ (wt %) | 5.31 | 3.04 | 1.6 |
| Sb:Br (molar) | 1:3 | 1:6 | 1:9 |
| Binder (wt %) | 5.25 | 5.23 | 5.27 |
| Dispersion Agent (wt %) | 0.83 | 0.83 | 0.83 |

Example 10

Application of Reduced Antimony F-3020 Formulations on a 50/50 Polyester/Cotton Fabric (Padding)

The F-3020 reduced-antimony aqueous dispersions prepared according to Example 9 were applied to 50/50 Polyester/Cotton 200 gr/m² by padding. Fabrics were cured at 160° C. for 4 minutes, bone dried and tested. Several replications were tested for the various combinations. Treated fabrics were tested according to ASTM D 6413-08 vertical flame, 12 seconds ignition. At least 3 samples were burned for each test/formulation. Results are provided in Tables 30-32 below:

A) For a Br:Sb molar ratio of 3:1 at an add-on of 27-33%, results are presented in Table 30:

TABLE 30

| Sample # | % Add-on | % FR | % Br | % ATO | flammability test After flame sec | After Glow sec | Char Length cm | Laundry cycles |
|---|---|---|---|---|---|---|---|---|
| 1979-81-01 | 28.0 | 16.7 | 9.3 | 5.7 | 0 | 94 | 16 | Before laundry |
| | | | | | 0 | 80 | 13.5 | 5 |
| 1979-81-02 | 33.2 | 19.7 | 11.1 | 6.7 | 0 | 56 | 13 | Before laundry |
| | | | | | 0 | 66 | 15 | 5 |
| 1979-81-03 | 27.4 | 16.3 | 9.1 | 5.5 | 0 | 68 | 14.0 | Before laundry |
| | | | | | 0 | 58 | 13.5 | 5 |
| 1979-81-04 | 32.1 | 19.1 | 10.7 | 6.5 | 0 | 63 | 14.5 | Before laundry |
| | | | | | 0 | 71 | 14.5 | 5 |

B) For a Br:Sb molar ratio of 6:1 at an add-on of 21-33%, results are presented in Table 31:

TABLE 31

| Sample # | % Add-on | % FR | % Br | % ATO | flammability test After flame sec | After Glow sec | Char Length cm | Laundry cycles |
|---|---|---|---|---|---|---|---|---|
| 2120-42-02 | 30.3 | 20.0 | 11.2 | 3.4 | 0 | 28 | 14.5 | Before laundry |
| | | | | | 0 | 10 | 16.5 | 5 |
| 2120-42-03 | 31.1 | 20.6 | 11.5 | 3.5 | 0 | 28 | 13.5 | Before laundry |
| | | | | | 0 | 14 | 13 | 5 |
| 2120-42-04 | 21.2 | 14.0 | 7.9 | 2.4 | 0 | 16 | 13.5 | Before laundry |
| | | | | | 0 | 13 | 15.5 | 5 |
| 2120-42-05 | 29.3 | 19.4 | 10.9 | 3.3 | 0 | 26 | 15 | Before laundry |
| | | | | | 0 | 15 | 13.5 | 5 |
| 2120-42-06 | 33.3 | 22.0 | 12.3 | 3.7 | 0 | 22 | 14 | Before laundry |
| | | | | | 0 | 22 | 14 | 5 |
| 2120-42-09 | 27.4 | 18.1 | 10.2 | 3.1 | 0 | 22 | 17.5 | Before laundry |
| | | | | | 0 | 22 | 11.5 | 5 |
| 2120-42-12 | 24.2 | 16.0 | 9.0 | 2.7 | 0 | 35 | 17.5 | Before laundry |
| | | | | | 0 | 20 | 17.0 | 5 |

C) For a Br:Sb molar ratio of 9:1 at an add-on of 27-33%, results are presented in Table 32:

TABLE 32

| Sample # | % Add-on | % FR | % Br | % ATO | flammability test After flame sec | After Glow sec | Char Length cm | Laundry cycles |
|---|---|---|---|---|---|---|---|---|
| 2120-46-02 | 27.1 | 18.8 | 10.6 | 2.1 | 0 | 20 | 14.5 | Before laundry |
| | | | | | 0 | 20 | 13 | 5 |
| 2120-46-03 | 25.8 | 18.0 | 10.1 | 2.0 | 0 | 21 | 15.5 | Before laundry |
| | | | | | 0 | 23 | 20 | 5 |
| 2120-46-04 | 22.2 | 15.4 | 8.6 | 1.8 | 0 | 21 | 17.5 | Before laundry |
| | | | | | BEL | | | 5 |
| 2120-46-05 | 24.6 | 17.1 | 9.6 | 1.9 | 0 | 23 | 17.5 | Before laundry |
| | | | | | 0 | 23 | 15 | 5 |

TABLE 32-continued

| Sample # | % Add-on | % FR | % Br | % ATO | After flame sec | After Glow sec | Char Length cm | Laundry cycles |
|---|---|---|---|---|---|---|---|---|
| 2120-46-06 | 20.3 | 14.2 | 7.9 | 1.6 | 0 BEL | 26 | 25 | Before laundry 5 |

TABLE 32-continued

| Sample # | % Add-on | % FR | % Br | % ATO | After flame sec | After Glow sec | Char Length cm | Laundry cycles |
|---|---|---|---|---|---|---|---|---|
| 2120-46-08 | 36.8 | 25.6 | 14.4 | 2.9 | 0 | 20 | 14 | Before laundry |
|  |  |  |  |  | 0 | 22 | 13 | 5 |
| 2120-46-09 | 28.3 | 19.7 | 11.0 | 2.2 | 0 | 18 | 12 | Before laundry |
|  |  |  |  |  | 0 | 18 | 13 | 5 |

BEL = burnt entire length

Example 11

Preparation of ATO-Free and Binder-Free F-2016 or F-3020 Formulations

F-2016 and F-3020 were prepared, similarly to Example 2, but without adding ATO or binder, having a total solid content of about 10-20%. The various formulations are provided in Table 33:

TABLE 33

| Composition Properties | F-2016 | F-2016 | F-3020 | F-3020 |
|---|---|---|---|---|
| Dry solids (wt %) | 10.42 | 20.84 | 10.42 | 20.84 |
| FR (wt %) | 10 | 20 | 10 | 20 |
| Br (wt %) | 5 | 10 | 5 | 10 |

Example 12

Application of MO-Free and Binder-Free F-2016 and F-3020 on a 100% Polyester Fabric (Exhaustion)

100% PET 229 gr/sqm fabric was padded with the formulation, dried and cured at different conditions to determine whether there is any difference between the reaction products: either 160° C. for 6 minutes, 160° C. for 8 minutes, 180° C. for 4 minutes or (as comparison) 205° C. for 2 minutes.

Samples were examined under SEM with XRD for the cross section. The samples were laundered five times according to AATCC Standard Practice for Home Laundry at 60° C. Results are presented in Table 34 below:

TABLE 34

| Sample # | Curing at: | % Dry Add-on | % FR | % Br | After flame sec | After Glow Sec | Char Length cm | Laundry Cycles |
|---|---|---|---|---|---|---|---|---|
| F-2016 | 1979-84-11 | 160° C. 6 min | 7.08 | 6.8 | 3.4 | 0 | 0 | 13 | Before laundry |
|  |  |  |  |  | 0 | 0 | 8 | 5 |
|  | 1979-84-15 | 205° C. 2 min | 9.55 | 9.17 | 4.6 | 0 | 0 | 13 | Before laundry |
|  |  |  |  |  | 0 | 0 | 8 | 5 |
| F-3020 | 1979-84-03 | 180° C. 4 min | 4.19 | 4.03 | 2.25 | 0 | 0 | 6 | Before laundry |
|  |  |  |  |  | 0 | 0 | 10 | 5 |
|  | 1979-84-07 | 160° C. 6 min | 12.27 | 11.78 | 6.6 | 0 | 0 | 12 | Before laundry |
|  |  |  |  |  | 0 | 0 | 8 | 5 |

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

The invention claimed is:
1. A flame retardant textile fabric having a homogeneous flame retardant film thereon or therein, said film comprising at least one brominated epoxy polymer, crosslinked on or in said textile fabric, wherein:
  a) said brominated epoxy polymer has a molecular weight ranging from 1,000 to 5,000 grams/mol; and
  b) said brominated epoxy polymer has a glass transition initiation temperature (Tg) that is lower than about 130° C.;
  c) said fabric comprises a flame retardant synergist and a binding agent, and optionally further comprises at least one additive selected from the group consisting of a smoldering suppressant agent, a surface active agent, an antifoaming agent, a preservative, a stabilizing agent, a thickening agent, a dispersing agent, a wetting agent, a suspending agent, a pH buffer, an anti creasing agent, a hardener, a curing agent, a sequestering agent, a detergent, a dye, a pigment and any mixture thereof, wherein said textile fabric is selected from the group consisting of garments, linen, decorative or technical textiles, draperies, carpets, tents, sleeping bags, toys, wall fabrics, decorative fabrics, mattresses and upholsteries, further wherein said textile fabric is composed of fibres selected from the group consisting of: wool, silk, cotton, linen, hemp, ramie, jute, acetate, lyocell, acrylic, polyolefin, polyamide, polylactic acid, polyester, rayon, viscose, spandex, metallic composite, ceramic, glass, carbon or carbonized composite, and any combination thereof, wherein said flame retardant textile fabric has an add-on ranging from 4% to 40%.

2. The flame retardant textile fabric of claim 1, having an "after flame" flame ranging from 0 seconds to 5 seconds and/or a char length ranging from 10 to 17 cm before laundry.

3. The flame retardant textile fabric of claim 2, having a washing fastness of at least 5 laundry cycles.

4. The flame retardant textile fabric of claim 3, having a washing fastness of at least 25 laundry cycles.

5. The flame retardant textile fabric of claim 1, wherein said film is transparent.

6. The flame retardant textile fabric of claim 1, wherein said textile fabric is composed of cotton, polyester or combinations thereof.

7. The flame retardant textile fabric of claim 1, wherein at least one aesthetical or textural property which is substantially the same as that of said textile fabric per se.

8. The flame retardant textile fabric of claim 1, being free of a flame retardant synergist and free of a binding agent, having an add-on lower than 12%.

9. The flame retardant textile fabric of claim 8, being composed of a hydrophobic fiber.

10. The flame retardant textile fabric of claim 9, wherein said hydrophobic fiber is selected from polypropylene, polyester and nylon.

11. A flame retarded textile fabric having a homogeneous flame retardant film thereon or therein, said film comprising said at least one brominated epoxy polymer, crosslinked on or in said textile fabric, wherein:
   a) said brominated epoxy polymer has a molecular weight ranging from 1,000 to 5,000 grams/mol; and
   b) said brominated epoxy polymer has a glass transition initiation temperature (Tg) that is lower than about 130° C.; and
   c) said fabric is free of a flame retardant synergist and free of a binding agent, wherein said fabric is obtained by exhaustion.

12. The flame retardant textile fabric of claim 11 being free of a flame retardant synergist and free of a binding agent, having an add-on lower than 12%, said flame retardant textile fabric being composed of a hydrophobic fibre selected from polypropylene, polyester and nylon.

* * * * *